US010415130B2

(12) United States Patent
Tsuru et al.

(10) Patent No.: US 10,415,130 B2
(45) Date of Patent: Sep. 17, 2019

(54) COPPER ALLOY SHEET STRIP WITH SURFACE COATING LAYER EXCELLENT IN HEAT RESISTANCE

(71) Applicant: KOBE STEEL, LTD., Kobe-shi (JP)

(72) Inventors: Masahiro Tsuru, Shimonoseki (JP); Daisuke Hashimoto, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/118,758

(22) PCT Filed: Feb. 13, 2015

(86) PCT No.: PCT/JP2015/054032
§ 371 (c)(1),
(2) Date: Aug. 12, 2016

(87) PCT Pub. No.: WO2015/122505
PCT Pub. Date: Aug. 20, 2015

(65) Prior Publication Data

US 2017/0044651 A1 Feb. 16, 2017

(30) Foreign Application Priority Data

Feb. 13, 2014 (JP) ................................ 2014-025495

(51) Int. Cl.
*B32B 15/01* (2006.01)
*C22F 1/08* (2006.01)
(Continued)

(52) U.S. Cl.
CPC ................ *C22F 1/08* (2013.01); *B22D 7/005* (2013.01); *C22C 9/02* (2013.01); *C22C 9/04* (2013.01);
(Continued)

(58) Field of Classification Search
CPC .... C22F 1/08; C22C 9/02; C25D 3/30; C25D 5/10; H01R 13/03; C23C 28/02
See application file for complete search history.

(56) References Cited

U.S. PATENT DOCUMENTS

2003/0091855 A1 5/2003 Tanaka et al.
2003/0129441 A1* 7/2003 Hara ...................... C23C 26/00 428/647
(Continued)

FOREIGN PATENT DOCUMENTS

JP 2844120 B2 1/1999
JP 2002-294368 A 10/2002
(Continued)

OTHER PUBLICATIONS

Application Datasheet Standard Designation for Wrought Alloys, Sep. 17, 2012, readbag.com.*
(Continued)

*Primary Examiner* — David Sample
*Assistant Examiner* — Mary I Omori
(74) *Attorney, Agent, or Firm* — Oblon, McClelland, Maier & Neustadt, L.L.P.

(57) ABSTRACT

Disclosed herein is a sheet strip including a copper alloy sheet strip, as a base material, and the surface coating layer containing a Ni layer, a Cu—Sn alloy layer and a Sn layer formed on a surface of the copper alloy sheet strip. The copper alloy sheet strip has a structure in which precipitates are dispersed in a copper alloy matrix. The Cu—Sn alloy layer is partially exposed on the outermost surface of the surface coating layer, and a surface exposed area ratio thereof is in a range of 3 to 75%. The Cu—Sn alloy layer contains 1) a η layer, or 2) a ε phase and a η phase, the ε phase existing between the Ni layer and the η phase.

14 Claims, 3 Drawing Sheets

(51) Int. Cl.

| | |
|---|---|
| ***C22C 9/02*** | (2006.01) |
| ***C22C 9/04*** | (2006.01) |
| ***C22C 9/06*** | (2006.01) |
| ***H01R 13/03*** | (2006.01) |
| ***C25D 5/10*** | (2006.01) |
| ***C25D 5/34*** | (2006.01) |
| ***C25D 5/50*** | (2006.01) |
| ***B22D 7/00*** | (2006.01) |
| ***C25D 3/12*** | (2006.01) |
| ***C25D 3/20*** | (2006.01) |
| ***C25D 3/30*** | (2006.01) |
| ***C25D 3/38*** | (2006.01) |
| ***C23C 28/02*** | (2006.01) |

(52) U.S. Cl.

CPC ................ *C22C 9/06* (2013.01); *C23C 28/02* (2013.01); *C23C 28/023* (2013.01); *C25D 3/12* (2013.01); *C25D 3/20* (2013.01); *C25D 3/30* (2013.01); *C25D 3/38* (2013.01); *C25D 5/10* (2013.01); *C25D 5/34* (2013.01); *C25D 5/505* (2013.01); *H01R 13/03* (2013.01); *H01R 2201/26* (2013.01)

(56) References Cited

U.S. PATENT DOCUMENTS

| | | | | |
|---|---|---|---|---|
| 2004/0209112 | A1 | 10/2004 | Hara et al. | |
| 2005/0037229 | A1 | 2/2005 | Tanaka | |
| 2008/0090096 | A1 | 4/2008 | Suzuki et al. | |
| 2009/0053553 | A1* | 2/2009 | Masago | B32B 15/01 428/647 |
| 2009/0116996 | A1 | 5/2009 | Aruga et al. | |
| 2010/0247959 | A1* | 9/2010 | Taira et al. | B23B 15/20 428/675 |
| 2010/0304016 | A1 | 12/2010 | Suzuki et al. | |
| 2011/0182767 | A1 | 7/2011 | Aruga et al. | |
| 2011/0206941 | A1 | 8/2011 | Koehler et al. | |
| 2011/0266035 | A1 | 11/2011 | Sakurai et al. | |
| 2013/0260174 | A1 | 10/2013 | Tsuru | |
| 2014/0134457 | A1 | 5/2014 | Sakurai et al. | |

FOREIGN PATENT DOCUMENTS

| | | | |
|---|---|---|---|
| JP | 2003-171790 | A | 6/2003 |
| JP | 2003-183882 | A | 7/2003 |
| JP | 2004-68026 | A | 3/2004 |
| JP | 2006-77307 | A | 3/2006 |
| JP | 2006-183068 | A | 7/2006 |
| JP | 2006-342389 | A | 12/2006 |
| JP | 2008-231492 | A | 10/2008 |
| JP | 2010-168598 | A | 8/2010 |
| JP | 2010-196084 | A | 9/2010 |
| JP | 2010-236038 | A | 10/2010 |
| JP | 2010-248616 | A | 11/2010 |
| JP | 2010-261067 | A | 11/2010 |
| JP | 2011-6760 | A | 1/2011 |
| JP | 2012-506952 | A | 3/2012 |
| JP | 2013-209680 | A | 10/2013 |

OTHER PUBLICATIONS

International Search Report dated May 12, 2015 in PCT/JP2015/054032 filed Feb. 13, 2015.

English translation of the International Preliminary Report on Patentability and Written Opinion dated Aug. 25, 2016 in PCT/JP2015/054032.

* cited by examiner

COPPER ALLOY SHEET STRIP WITH SURFACE COATING LAYER EXCELLENT IN HEAT RESISTANCE

CROSS-REFERENCE TO RELATED APPLICATIONS

This application is a National Stage of PCT/JP2015/054032, which was filed on Feb. 13, 2015. This application is based upon and claims the benefit of priority to Japanese Application No. 2014-025495, which was filed on Feb. 13, 2014.

TECHNICAL FIELD

The present invention relates to a copper alloy sheet strip with a surface coating layer, which is mainly used as a conductive material for connection components such as terminals in the fields of automobiles and household appliances, and which can maintain contact resistance of the terminal contact section at a low value over a long time.

BACKGROUND ART

In a connector used for connection of electric wires of automobiles etc., a fitting type connection terminal composed of a combination of a male terminal and a female terminal is used. In recent years, electrical components have been mounted in the engine room of automobiles, and there is a need for the connector to ensure electrical characteristics (low contact resistance) after the lapse of a long time at high temperature.

When a copper alloy sheet strip with a surface coating layer, in which a Sn layer is formed as the surface coating layer on the outermost surface, is held over a long time under a high temperature environment, contact resistance increases. Meanwhile, for example, Patent Document 1 (JP 2004-68026 A as Patent Document 1 is incorporated by reference herein) discloses that a surface coating layer to be formed on a surface of a base material (copper alloy sheet strip) is provided with a three-layer structure of ground layer (made of Ni, etc.)/Cu—Sn alloy layer/Sn layer. According to the surface coating layer having this three-layer structure, a ground layer suppresses diffusion of Cu from the base material and a Cu—Sn alloy layer suppresses diffusion of the ground layer, whereby, low contact resistance can be maintained even after the lapse of a long time at high temperature.

Patent Documents 2 and 3 (JP 2006-77307 A as Patent Document 2 and JP 2006-183068 A as Patent Document 3 are incorporated by reference herein) disclose that a surface coating layer of a copper alloy sheet strip with a surface coating layer, in which a surface of a base material is subjected to a roughening treatment, is provided with the above-mentioned three-layer structure.

Patent Document 4 (JP 2010-168598 A as Patent Document 4 is incorporated by reference herein) discloses that, in a surface coating layer having a three-layer structure of Ni layer/Cu—Sn alloy layer/Sn layer, a Cu—Sn alloy layer is composed of two phases of a ε ($Cu_3Sn$) phase at the Ni layer side and a η ($Cu_6Sn_5$) phase at the Sn phase side, and an area coating ratio of the ε phase, with which the Ni layer is coated, is adjusted to 60% or more. To obtain this surface coating layer, there is a need that a reflow treatment is composed of a heating step, a primary cooling step and a secondary cooling step; and a temperature rise rate and a reaching temperature are precisely controlled in the heating step, a cooling rate and a cooling time are precisely controlled in the primary cooling step, and a cooling rate is precisely controlled in the secondary cooling step. Patent Document 4 discloses that this surface coating layer enables maintenance of low contact resistance even after the lapse of a long time at high temperature, and also enables prevention of peeling of the surface coating layer.

A Cu—Ni—Sn—P-based copper alloy sheet strip disclosed, for example, in Patent Documents 5 and 6 (JP 2006-342389 A as Patent Document 5 and JP 2010-236038 as Patent Document 6 are incorporated by reference herein) is used as a base material which forms a surface coating layer whose outermost surface is a Sn layer. This copper alloy sheet strip has excellent bending workability, shear punchability and stress relaxation resistance, and a terminal formed from this copper alloy sheet strip is excellent in stress relaxation resistance, so that the terminal has high holding stress even after the lapse of a long time at high temperature, thus enabling maintenance of high electric reliability (low contact resistance).

PRIOR ART DOCUMENT

Patent Document

Patent Document 1: JP 2004-68026 A
Patent Document 2: JP 2006-77307 A
Patent Document 3: JP 2006-183068 A
Patent Document 4: JP 2010-168598 A
Patent Document 5: JP 2006-342389 A
Patent Document 6: JP 2010-236038 A

DISCLOSURE OF THE INVENTION

Problems to be Solved by the Invention

Patent Documents 1 to 3 disclose that low contact resistance was maintained even after the lapse of a long time at high temperature (at 160° C. for 120 hours). Patent Document 4 discloses that low contact resistance was maintained even after the lapse of a long time at high temperature (at 175° C. for 1,000 hours) and also peeling of the surface coating layer did not occur after the lapse of a long time at high temperature (at 160° C. for 250 hours).

In the measurement of contact resistance and the test of thermal peeling resistance mentioned in Patent Documents 1 to 4, elastic stress is not applied to a test specimen while holding the test specimen at high temperature over a long time. Meanwhile, in an actual fitting type terminal, a male terminal and a female terminal keep in contact with each other by elastic stress at the fitting section. When the male or female terminal is formed using the copper alloy sheet strip with a surface coating layer in which the surface coating layer having a three-layer structure is formed, followed by holding under a high temperature environment in a state of being fitted with each female or male terminal, elastic stress activates change in phase from a phase to a η phase as well as diffusion of elements of a base material and a ground layer. Therefore, contact resistance is likely to increase after the lapse of a long time at high temperature, and also peeling is likely to occur at an interface between a base material and a surface coating layer or an interface between a ground layer and a Cu—Sn alloy layer.

These problems also occur when using, as the material of a male or female terminal, a copper alloy sheet strip with a surface coating layer, which is obtained by using the copper alloy sheet strip disclosed in Patent Documents 5 and 6 is used as a base material and forming the above-mentioned surface coating layer having a three-layer structure, thus requiring an improvement thereof.

The present invention is directed to an improvement in a copper alloy sheet strip with a surface coating layer in which the above-mentioned surface coating layer having a three-layer structure is formed on a surface of a base material composed of a Cu—Ni—Sn—P-based copper alloy sheet strip. A main object of the present invention is to provide a copper alloy sheet strip with a surface coating layer, which can maintain low contact resistance even after the lapse of a long period of time at high temperature in a state applying elastic stress. Another object of the present invention is to provide a copper alloy sheet strip with a surface coating layer, which has excellent thermal peeling resistance even after the lapse of a long period of time at high temperature in a state applying elastic stress.

Means for Solving the Problems

The copper alloy sheet strip with a surface coating layer according to the present invention includes a copper alloy sheet strip, as a base material, consisting of Ni: 0.4 to 2.5% by mass, Sn: 0.4 to 2.5% by mass and P: 0.027 to 0.15% by mass, a mass ratio Ni/P between the Ni content to the P content being less than 25, as well as any one of Fe: 0.0005 to 0.15% by mass, Zn: 1% by mass or less, Mn: 0.1% by mass or less, Si: 0.1% by mass or less and Mg: 0.3% by mass or less, with the balance being Cu and inevitable impurities, and having a structure in which precipitates are dispersed in a copper alloy matrix, each precipitate having a diameter of 60 nm or less, 20 or more precipitates each having a diameter of 5 nm or more and 60 nm or less being observed in the visual field of 500 nm×500 nm; and the surface coating layer composed of a Ni layer, a Cu—Sn alloy layer and a Sn layer formed on a surface of the copper alloy sheet strip in this order. The Ni layer has an average thickness of 0.1 to 3.0 μm, the Cu—Sn alloy layer has an average thickness of 0.1 to 3.0 μm, and the Sn layer has an average thickness of 0.05 to 5.0 μm. The Cu—Sn alloy layer is partially exposed on the outermost surface of the surface coating layer and a surface exposed area ratio thereof is in a range of 3 to 75% (see Patent Document 2). The Cu—Sn alloy layer is composed only of a η phase ($Cu_6Sn_5$), or a ε phase ($Cu_3Sn$) and a η phase. When the Cu—Sn alloy layer is composed of the ε phase and the η phase, the ε phase exists between the Ni layer and the η phase, a ratio of the average thickness of the ε phase to the average thickness of the Cu—Sn alloy layer is 30% or less, and a ratio of the length of the ε phase to the length of the Ni layer is 50% or less. The Ni layer and the Sn layer include, in addition to Ni and Sn metals, a Ni alloy and a Sn alloy, respectively.

The copper alloy sheet strip with a surface coating layer has the following desirable embodiments.

(1) The copper alloy sheet strip as a base material further includes one or more of Cr, Co, Ag, In, Be, Al, Ti, V, Zr, Mo, Hf, Ta and B in the total amount of 0.1% by mass or less.

(2) Surface roughness of the surface coating layer is sometimes 0.15 μm or more in terms of arithmetic average roughness Ra in at least one direction, and also 3.0 μm or less in terms of arithmetic average roughness Ra in all directions (see Patent Document 3) and less than 0.15 μm in terms of arithmetic average roughness Ra in all directions.

(3) The Sn layer is composed of a reflow Sn plating layer and a gloss or non-gloss Sn plating layer formed thereon.

(4) A Co layer or a Fe layer is formed in place of the Ni layer, and the Co layer or the Fe layer has an average thickness of 0.1 to 3.0 μm.

(5) When the Ni layer exists, a Co layer or a Fe layer is formed between a surface of the base material and the Ni layer, or between the Ni layer and the Cu—Sn alloy layer, and the total average thickness of the Ni layer and the Co layer or the Ni layer and the Fe layer is in a range of 0.1 to 3.0 Tim.

(6) On the material surface (surface of the surface coating layer) after heating in atmospheric air at 160° C. for 1,000 hours, $Cu_2$ O does not exist at a position deeper than 15 nm from the outermost surface.

Effects of the Invention

According to the present invention, it is possible to maintain excellent electrical characteristics (low contact resistance) after heating at high temperature over a long time in a state of applying elastic stress in a copper alloy sheet strip with a surface coating layer, using a Cu—Ni—Sn—P-based copper alloy sheet strip as a base material. Therefore, this copper alloy sheet strip with a surface coating layer is suited for use as a material of a multipole connector to be disposed under a high temperature atmosphere, for example, the engine room of automobiles.

In a cross-section of a surface coating layer, a ratio of the length of the ε phase to the length of the Ni layer is adjusted to 50% or less, whereby, excellent thermal peeling resistance can be obtained even after the lapse of a long time at high temperature in a state of applying elastic stress.

Furthermore, the copper alloy sheet strip with a surface coating layer, in which a Cu—Sn alloy layer is partially exposed on the outermost surface of the surface coating layer, can suppress a friction coefficient to be low, and is particularly suited for use as a material for a fitting type terminal.

MODE FOR CARRYING OUT THE INVENTION

Figure 1:
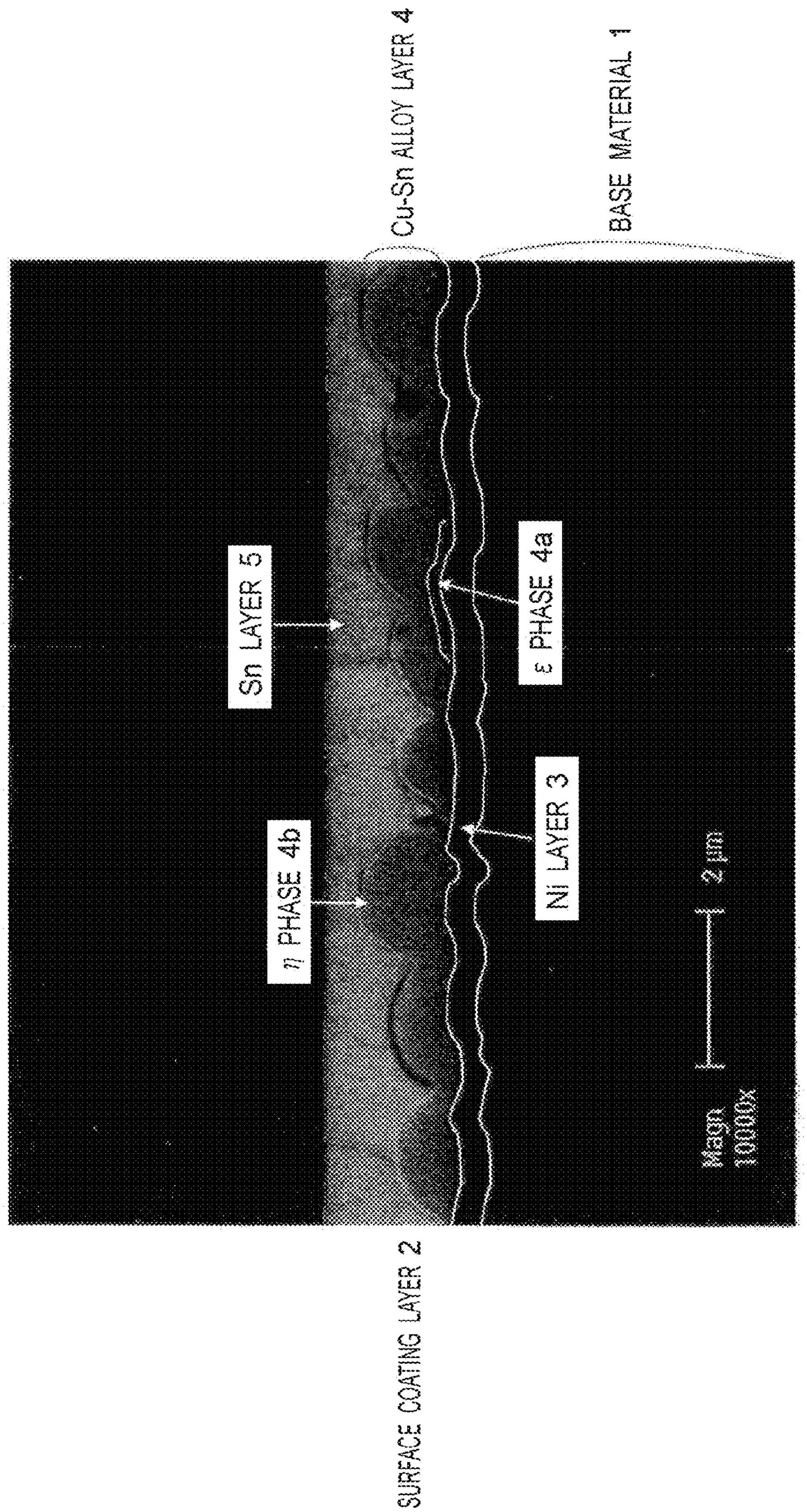
FIG. 1 shows a cross-sectional composition image taken by a scanning electron microscope of the test material No. 1 of Examples.

The structure of the copper alloy sheet strip with a surface coating layer according to the present invention will be specifically described below.

(I) Copper Alloy Sheet Strip as Base Material (1) Chemical Composition of Copper Alloy Sheet Strip Chemical composition of a Cu—Ni—Sn—P-based copper alloy sheet strip (base material) according to the present invention is as basically mentioned in detail in Patent Document 5.

Ni is an element that is solid-soluted in a copper alloy to thereby enhance stress relaxation resistance, leading to an increase in strength. However, when the content of Ni is less than 0.4% by mass, less effect is exerted. When the content exceeds 2.5% by mass, it easily precipitates an intermetallic compound together with P that is simultaneously added to thereby reduce solid-soluted Ni, leading to degradation of stress relaxation resistance. When the content of Ni content exceeds 2.5% by mass, it becomes impossible to achieve conductivity of 25% IACS, and also there is a need to raise a finishing continuous annealing temperature in the production process, so that bending workability of the copper alloy sheet strip is degraded as a result of grain coarsening. Therefore, the content of Ni is set in a range of 0.4 to 2.5% by mass. Preferably, the lower limit is set at 0.7% by mass and the upper limit is set at 2.0% by mass. When higher conductivity (30% IACS or more) is required, the upper limit is preferably set at 1.6% by mass.

Sn is an element that is solid-soluted in a copper alloy to thereby increase the strength due to work hardening, and also contributes to an improvement in heat resistance. In the copper alloy sheet according to the present invention, there is a need to perform finish annealing at high temperature so as to improve bending workability and shear punchability. When the content of Sn is less than 0.4% by mass, heat resistance is not improved and recrystallization softening proceeds during finish annealing, thus failing to sufficiently raise the temperature of finish annealing. Meanwhile, when the content of Sn exceeds 2.5% by mass, conductivity is degraded, thus failing to achieve 25% IACS. Therefore, the content of Sn is set in a range of 0.4 to 2.5% by mass. Preferably, the lower limit is 0.6% by mass and the upper limit is 2.0% by mass. When higher conductivity (30% IACS or more) is required, the upper limit is preferably set at 1.6% by mass.

There is also a merit that solid-soluted Ni required to improve stress relaxation resistance is sufficiently obtained by performing finish annealing at high temperature.

P is an element that generates Ni—P precipitates during the production process to thereby improve heat resistance during finish annealing. Whereby, it becomes possible to perform finish annealing at high temperature, leading to an improvement in bending workability and shear punchability. However, when the content of P is less than 0.027% by mass, P becomes likely to combine with Ni, whose additive amount is comparatively more than that of P, to form a firm Ni—P intermetallic compound. Meanwhile, P is added in the amount of more than 0.15% by mass, the amount of the Ni—P intermetallic compound precipitated further increases. Therefore, in both cases, re-solid solution of the Ni—P intermetallic compound does not occur during finish annealing, so that bending workability and shear punchability are degraded and also solid-soluted Ni for improving stress relaxation resistance is not sufficiently obtained. Therefore, the content of P is set in a range of 0.027 to 0.15% by mass. Preferably, the lower limit is 0.05% by mass and the upper limit is 0.08% by mass.

It is possible to reconcile an improvement in heat resistance due to Ni—P precipitates as well as decomposition and re-solid solution of Ni—P precipitates during finish annealing by setting a mass ratio Ni/P of the Ni content to the P content at less than 25. When this mass ratio Ni/P is 25 or more, heat resistance after finish annealing at high temperature becomes insufficient and finishing annealing must be performed at comparatively low temperature, so that bending workability and shear punchability are not improved, thus failing to obtain sufficient stress relaxation resistance. The mass ratio Ni/P is preferably less than 15.

If necessary, the copper alloy according to the present invention can include, as the secondary component, Fe. Fe is an element that suppresses coarsening of recrystallized grains during finish annealing. When the content of Fe is 0.0005% by mass or more, the finish annealing temperature is raised, thus making it possible to sufficiently solid-solute additive elements and to suppress coarsening of recrystallized grains. However, when the content of Fe exceeds 0.15%, conductivity is degraded, thus failing to achieve about 25% IACS. Therefore, the content of Fe is set in a range of 0.0005 to 0.15% by mass.

If necessary, the copper alloy according to the present invention can include, as the secondary component, one or more of Zn, Mn, Mg and Si. Zn has the effect of preventing peeling of tin plating, and added in the amount in a range of 1% by mass or less. Sufficient effect is exerted by adding 0.05% by mass or less of Zn if the temperature is in a temperature region (about 150 to 180° C.) where the copper alloy is used as a terminal for automobiles. Mn and Si serve as a deoxidizing agent and are added, respectively, in the amount of 0.1% by mass or less. Preferably, the contents of Mn and Si are 0.001% by mass or less and 0.002% by mass or less, respectively. Mg has the effect of improving stress relaxation resistance, and is added in the amount of 0.3% by mass or less.

If necessary, the copper alloy according to the present invention can include, as the secondary component, one or more of Cr, Co, Ag, In, Be, Al, Ti, V, Zr, Mo, Hf, Ta and B.

These elements have the effect of preventing coarsening of crystal grains, and are added in the total amount in a range of 0.1% or less.

(2) Structure of Copper Alloy Sheet Strip

The copper alloy sheet strip (base material) according to the present invention has a structure that precipitates of a Ni—P intermetallic compound are dispersed in a copper alloy matrix, as mentioned in detail in Patent Document 5.

Of precipitates, particles having a diameter of more than 60 nm may cause generation of cracking in bending with small R/t (R: bending radius, t: thickness) and bending workability is degraded if the particles exist. Meanwhile, precipitates serve as a starting point of causing the crack during shear punching, and high density distribution of these precipitates leads to excellent shear punchability. Fine precipitates having a diameter of less than 5 nm interact with dislocations in a shear stress field to cause local work hardening, thus contributing to propagation and progress of shear punching. When precipitates having a diameter of 5 nm or more are dispersed, a fracture surface of shear punching proceeds through a place where the precipitates exist, so that shear punchability is improved, which is useful to reduce burr. Therefore, regarding precipitate particles having a diameter 60 nm or less, which do not cause degradation of bending workability, desirably 20 or more, and more desirably 30 or more, on average, precipitate particles having a diameter of 5 nm or more exist in the visual field of 500 nm×500 nm. The diameter of a precipitate particle in the present invention means a diameter (major axis) of a circumscribed circle of the precipitate particle.

(3) Method for Producing Copper Alloy Sheet Strip

As mentioned in detail in Patent Documents 5 and 6, the copper alloy sheet according to the present invention strip (base material) can be produced by subjecting a copper alloy ingot to a homogenization treatment, hot rolling and cold rough rolling, and then subjecting the copper alloy sheet to continuous annealing after cold rough rolling, followed by cold finish rolling and stabilization annealing.

The homogenization treatment is performed at 800 to 1,000° C. for 0.5 to 4 hours and hot rolling is performed at 800 to 950° C. and, after hot rolling, water cooling or natural cooling is performed. In cold rough rolling, a working ratio is selected so as to obtain the working ratio of about 30 to 80% during cold finish rolling. It is possible to appropriately perform intermediate recrystallization annealing on the way of cold rough rolling.

Continuous annealing is performed by short-duration high-temperature annealing of holding at a substance temperature of 650° C. or higher for 15 to 30 seconds and, after annealing, rapid cooling is performed at a cooling rate of 10° C./second or higher. Whereby, coarse precipitates generated in a low temperature region are decomposed and re-solid soluted to thereby precipitate a fine Ni—P compound. When the holding temperature is lower than 650° C., precipitate particles having a diameter of more than 60 nm are likely to be observed. In the composition region with very small Ni and P contents, there are not enough particles having a diameter of 60 nm or less. Whereas, even when the holding temperature is 650° C. or higher, too short holding time leads to insufficient decomposition and re-solid solution of coarse precipitates, thus remaining precipitates having a diameter of more than 60 nm. To the contrary, too long holding time may cause degradation of bending workability as a result of coarsening of recrystallized grains.

It is desirable that stabilization annealing after cold finish rolling is performed at 250 to 450° C. for 20 to 40 seconds or performed at 200 to 400° C. for 0.1 to 10 hours. Stabilization annealing under these conditions enables suppression of a decrease in strength and removing strain introduced by cold finish rolling. When stabilization annealing is performed under the conditions at high temperature for a short time, the stress relaxation ratio and conductivity tend to decrease. When stabilization annealing is performed under the conditions at low temperature for a long time, the stress relaxation ratio and conductivity tend to increase.

(II) Surface Coating Layer (1) Average Thickness of Ni Layer

The Ni layer, as a ground layer, suppresses diffusion of a base material constituent element to the material surface to thereby suppress growth of a Cu—Sn alloy layer, thus preventing consumption of a Sn layer, leading to suppression of an increase in contact resistance after use at high temperature over a long time. However, when a Ni layer has an average thickness of less than 0.1 μm, it becomes impossible to sufficiently exert the effect because of increasing of point defects in the Ni layer. Meanwhile, when the Ni layer becomes thick, namely, the average thickness thereof becomes more than 3.0 μm, the effect is saturated, formability into a terminal degrades, such as causing cracking during bending, and also productivity and economy degrade. Therefore, the average thickness of the Ni layer is set in a range of 0.1 to 3.0 μm. Regarding the average thickness of the Ni layer, preferably, the lower limit is 0.2 μm and the upper limit is 2.0 μm.

A small amount of a component element included in the base material may be mixed in the Ni layer. When a Ni coating layer is made of a Ni alloy, examples of constituents other than Ni of the Ni alloy include Cu, P, Co and the like. Preferably, the proportion of Cu in the Ni alloy is 40% by mass or less, and the proportions of P and Co are 10% by mass or less.

(2) Average Thickness of Cu—Sn Alloy Layer

The Cu—Sn alloy layer prevents diffusion of Ni into the Sn layer. When the Cu—Sn alloy layer has an average thickness of less than 0.1 μm, the effect of preventing diffusion is insufficient, so that Ni diffuses into a surface of the Cu—Sn alloy layer or the Sn layer to form an oxide. Since volume resistivity of oxide of Ni is at least 1,000 times larger than that of oxide of Sn and oxide of Cu, contact resistance increases, thus degrading electric reliability. Meanwhile, when the average thickness of the Cu—Sn alloy layer exceeds 3.0 μm, formability into a terminal is degraded, that is, cracking occurs during bending. Therefore, the average thickness of the Cu—Sn alloy layer is set in a range of 0.1 to 3.0 μm. Regarding the average thickness of the Cu—Sn alloy layer, preferably, the lower limit is 0.2 μm and the upper limit is 2.0 μm.

(3) Phase Structure of Cu—Sn Alloy Layer

The Cu—Sn alloy layer is composed only of a η phase ($Cu_6Sn_5$), or a ε phase ($Cu_3Sn$) and a η phase. When the Cu—Sn alloy layer is composed of a ε phase and a η phase, the ε phase is formed between the Ni layer and the η phase, and is in contact with the Ni layer. The Cu—Sn alloy layer is a layer that is formed as a result of a reaction of Cu of a Cu plating layer with Sn of a Sn plating layer by a reflow treatment. When a relation between the thickness (ts) of Sn plating and the thickness (tc) of Cu plating before the reflow treatment is expressed by the inequality impression: ts/tc>2, only a η phase is formed in an equilibrium state. However, actually, a ε phase as a non-equilibrium phase is also formed according to the reflow treatment conditions.

Since the ε phase is hard as compared with the η phase, a coating layer becomes hard if the ε phase exists, thus contributing to a decrease in friction coefficient. However, when the ε phase has a large average thickness, the ε phase is brittle as compared with the η phase, thus degrading formability into a terminal, such as occurrence of cracking during bending. The ε phase as a nonequilibrium phase is converted into the η phase as an equilibrium phase at a temperature of 150° C. or higher, and Cu of the ε phase is thermally diffused into the η phase and the Sn layer to thereby reach a surface of the Sn layer, the amount of oxide of Cu ($Cu_2$ O) on the material surface increases and thus contact resistance is likely to increase, so that it becomes difficult to maintain reliability of electrical connection. Furthermore, thermal diffusion of Cu of the ε phase leads to formation of voids at an interface between the Cu—Sn alloy layer and the ground layer (including, in addition to the Ni layer, below-mentioned Co layer and Fe layer) at a place where the ε phase existed, so that peeling is likely to occur at the interface between the Cu—Sn alloy layer and the ground layer. For these reasons, a ratio of the average thickness of the ε phase to the average thickness of the Cu—Sn alloy layer is set at 30% or less. When the Cu—Sn alloy layer is composed only of the η phase, this ratio is 0%. The ratio of the average thickness of the ε phase to the average thickness of the Cu—Sn alloy layer is preferably 20% or less, and more preferably 15% or less.

To more effectively suppress peeling at the interface between the Cu—Sn alloy layer and the ground layer, it is desirable to set a ratio of the length of the ε phase to the length of the ground layer in a cross-section of the surface coating layer at 50% or less, in addition to the above-mentioned limitation. This is because the voids are generated at the place where the ε phase existed. The ratio of the length of the ε phase to the length of the ground layer is preferably 40% or less, and more preferably 30% or less. When the Cu—Sn alloy layer is composed only of the η phase, this ratio is 0%.

(4) Average Thickness of Sn Layer

When the Sn layer has an average thickness of less than 0.05 μm, the amount of oxide of Cu on the material surface due to thermal diffusion such as high temperature oxidation increases, so that contact resistance is likely to increase and also corrosion resistance is degraded, thus making it difficult to maintain reliability of electrical connection. When the average thickness of the Sn layer becomes less than 0.05 μm, a friction coefficient increases and an insertion force when formed into a fitting terminal increases. Meanwhile, when the average thickness of the Sn layer exceeds 5.0 μm, it is economically disadvantageous and also productivity is degraded. Therefore, the average thickness of the Sn layer is set in a range of 0.05 to 5.0 μm. The lower limit of the average thickness of the Sn layer is preferably 0.1 μm, and more preferably 0.2 μm, while the upper limit of the average thickness of the Sn layer is preferably 3.0 μm, and more preferably 2.0 μm. When low insertion force is considered to be important as the terminal, the average thickness of the Sn layer is preferably set in a range of 0.05 to 0.4 μm.

When the Sn layer is made of a Sn alloy, examples of constituents other than Sn of the Sn alloy include Pb, Bi, Zn, Ag, Cu and the like. The proportion of Pb in the Sn alloy is preferably less than 50% by mass, and the proportion of the other element is preferably less than 10% by mass.

After the reflow treatment, gloss or non-gloss Sn plating (average thickness is preferably in a range of 0.01 to 0.2 μm) is sometimes performed (see JP 2009-52076 A). In that case, the total average thickness of the Sn layer (reflow Sn plating layer+gloss or non-gloss Sn plating layer) is set in a range of 0.05 to 5.0 μm.

(5) Exposed Area Ratio Cu—Sn Alloy Layer

When reduction in friction is required when a male terminal and a female terminal are inserted or extracted, the Cu—Sn alloy layer may be partially exposed on the outermost surface of the surface coating layer. The Cu—Sn alloy layer is very hard as compared with Sn or a Sn alloy that forms the Sn layer, and partial exposure of the Cu—Sn alloy layer on the outermost surface enables suppression of deformation resistance due to digging up of the Sn layer when the terminal is inserted or extracted, and shearing resistance to shear adhesion of Sn—Sn, thus making it possible to significantly reduce a friction coefficient. The Cu—Sn alloy layer that is exposed on the outermost surface of the surface coating layer is a η phase and, when the exposed area ratio is less than 3%, the friction coefficient is not sufficiently reduced, thus failing to obtain sufficiently the effect of reducing an insertion force of the terminal. Meanwhile, when the exposed area ratio of the Cu—Sn alloy layer exceeds 75%, the amount of oxide of Cu on the surface of the surface coating layer (Sn layer) due to the lapse of time and corrosion increases and contact resistance is likely to increase, thus making it difficult to maintain reliability of electrical connection. Therefore, the exposed area ratio of the Cu—Sn alloy layer is set in a range of 3 to 75% (see Patent Documents 2 and 3). Regarding the exposed area ratio of the Cu—Sn alloy layer, preferably, the lower limit is 10% and the upper limit is 50%.

The exposure form of the Cu—Sn alloy layer that is exposed on the outermost surface of the surface coating layer includes various forms, and Patent Documents 2 and 3 disclose a random structure in which the exposed Cu—Sn alloy layer is irregularly distributed, and a linear structure in which the exposed Cu—Sn alloy layer extends in parallel. JP 2013-185193 A mentions a linear structure in which a copper alloy of a base material is limited to a Cu—Ni—Si-based alloy and the exposed Cu—Sn alloy layer extends in parallel with the rolling direction (exposed area ratio of the Cu—Sn alloy layer is in a range of 10 to 50%). JP 2013-209680 A mentions a composite form composed of a random structure in which the exposed Cu—Sn alloy layer is irregularly distributed and a linear structure in which the exposed Cu—Sn alloy layer extends in parallel with the rolling direction (the total exposed area ratio of the Cu—Sn alloy layer is in a range of 3 to 75%). In the copper alloy sheet strip with a surface coating layer according to the present invention, all of these exposure forms are permitted.

When the exposure form of the Cu—Sn alloy layer is a random structure, the friction coefficient decreases regardless of the insertion or extraction direction of the terminal. Meanwhile, in case the exposure form of the Cu—Sn alloy layer is a linear structure, or a composite form composed of a random structure and a linear structure, the friction coefficient becomes lowest when the insertion or extraction direction of the terminal is a direction vertical to the linear structure. Therefore, when the insertion or extraction direction of the terminal is set at the rolling vertical direction, the linear structure is desirably formed in the rolling parallel direction.

(6) Surface Roughness of Surface Coating Layer when Cu—Sn Alloy Layer is Exposed (6a) The copper alloy sheet strip with a surface coating layer mentioned in Patent Document 3 is produced by subjecting a base material (copper alloy sheet strip itself) to a roughening treatment, and subjecting a surface of the base material to Ni plating, Cu plating and Sn plating in this order, followed by a reflow treatment. The surface roughness of the base material subjected to the roughening treatment is set at 0.3 μm or more in terms of arithmetic average roughness Ra in at least one direction, and 4.0 μm or less in terms of arithmetic average roughness Ra in all directions. Regarding the thus obtained copper alloy sheet strip with a surface coating layer, surface roughness of the surface coating layer is 0.15 μm or more in terms of arithmetic average roughness Ra in at least one direction, and 3.0 μm or less in terms of arithmetic average roughness Ra in all directions. Since the base material has unevenness on a surface after roughening, and the Sn layer is smoothened by the reflow treatment, the Cu—Sn alloy layer exposed on the surface after the reflow treatment partially protrudes from the surface of the Sn layer.

Also in the copper alloy sheet strip with a surface coating layer according to the present invention, like the copper alloy sheet strip with a surface coating layer mentioned in Patent Document 3, the Cu—Sn alloy layer is partially exposed, thus making it possible to set surface roughness of the surface coating layer at 0.15 μm or more in terms of arithmetic average roughness Ra in at least one direction, and 3.0 μm or less in terms of arithmetic average roughness Ra in all directions. Preferably, arithmetic average roughness Ra in at least one direction is 0.2 μm or more, and arithmetic average roughness Ra in all directions is 2.0 μm or less.

(6b) The copper alloy sheet strip with a surface coating layer mentioned in Patent Document 2 is produced by the same process (see (6a)) as in the copper alloy sheet strip with a surface coating layer mentioned in Patent Document 3. The surface roughness of the base material (copper alloy sheet strip itself) is set at 0.15 μm or more in terms of arithmetic average roughness Ra in at least one direction, and 4.0 μm or less in terms of arithmetic average roughness Ra in all directions. This range of surface roughness includes smaller side of surface roughness as compared with that of the base material of the copper alloy sheet strip with a surface coating layer mentioned in Patent Document 3. Therefore, in the copper alloy sheet strip with a surface coating layer mentioned in Patent Document 2, it is possible to obtain a surface coating layer having surface roughness identical to or smaller than that mentioned in (6a). Therefore, the copper alloy sheet strip with a surface coating layer mentioned in Patent Document 2 includes the case where arithmetic average roughness Ra of the surface coating layer is less than 0.15 μm in all directions. In this case, it is estimated that the Cu—Sn alloy layer exposed on the surface does not sometimes protrude from a surface of a Sn layer.

Also in the copper alloy sheet strip with a surface coating layer according to the present invention, like the copper alloy sheet strip with a surface coating layer mentioned in Patent Document 2, the Cu—Sn alloy layer is partially exposed, thus making it possible to obtain a surface coating layer having surface roughness identical to or smaller than that mentioned in (6a). Therefore, the copper alloy sheet strip with a surface coating layer according to the present invention includes the case where arithmetic average roughness Ra of the surface coating layer is less than 0.15 μm in all directions.

(6c) Meanwhile, even when arithmetic average roughness of a surface of the base material (copper alloy sheet strip itself) is less than 0.15 μm in all directions, it is possible to allow a Sn layer having a predetermined thickness to remain on the outermost surface and to partially expose the Cu—Sn alloy layer on the outermost surface by performing Ni plating, Cu plating and Sn plating in this order, followed by a reflow treatment. While the production process is mentioned below, as a result, it is possible to obtain a surface coating layer which has arithmetic average roughness Ra of less than 0.15 μm in all directions after a reflow treatment, and has a Sn layer having a predetermined thickness on the outermost surface, the Cu—Sn alloy layer being exposed on the surface. The Cu—Sn alloy layer of this surface coating layer does not protrude from a surface of a Sn layer.

When deep roll marks and polishing marks are formed on a surface of a base material, there is a possibility that bending workability of the base material is degraded and abnormal precipitation of Ni plating occurs due to an affected layer formed on a surface. When the surface of the base material is slightly roughened, it is possible to avoid the problem.

(7) Surface Exposure Distance of Cu—Sn Alloy Layer

In the surface coating layer in which a Cu—Sn alloy layer is partially exposed on the outermost surface, it is desirable that an average surface exposure distance of the Cu—Sn alloy layer in at least one direction of the surface is set in a range of 0.01 to 0.5 mm. Herein, the average surface exposure distance of the Cu—Sn alloy layer is defined as a value obtained by adding an average width of the Sn layer to an average width (length along a straight line) of the Cu—Sn alloy layer that crosses a straight line drawn on a surface of the surface coating layer.

When the average surface exposure distance of the Cu—Sn alloy layer is less than 0.01 mm, the amount of oxide of Cu on the material surface due to thermal diffusion such as high temperature oxidation increases, so that contact resistance is likely to increase, thus making it difficult to maintain reliability of electrical connection. Meanwhile, when the average surface exposure distance of the Cu—Sn alloy layer exceeds 0.5 mm, it becomes difficult to obtain a low friction coefficient when particularly used as a down-sized terminal. In general, when the terminal is down-sized, the contact area of an electric contacting point (insertion or extraction section) such as indent or rib decreases, thus increasing contact probability between only Sn layers during insertion or extraction. Whereby, the amount of adhesion increases, thus making it difficult to obtained a low friction coefficient. Therefore, it is desirable to set the average surface exposure distance of the Cu—Sn alloy layer in a range of 0.01 to 0.5 mm in at least one direction. More desirably, the average surface exposure distance of the Cu—Sn alloy layer is set in a range of 0.01 to 0.5 mm in all directions. Whereby, contact probability between only Sn layers during insertion or extraction decreases. Regarding the average surface exposure distance of the Cu—Sn alloy layer, preferably, the lower limit is 0.05 mm and the upper limit is 0.3 mm.

The Cu—Sn alloy layer formed between the Cu plating layer and the molten Sn plating layer usually grows while reflecting a surface conformation of a base material (copper alloy sheet strip) and surface exposure distance of the Cu—Sn alloy layer in the surface coating layer nearly reflects an unevenness average distance Sm of a surface of the base material. Therefore, in order to adjust the average surface exposure distance of the Cu—Sn alloy layer in at least one direction of a surface of a coating layer in a range of 0.01 to 0.5 mm, it is desirable that the unevenness average distance Sm calculated in at least one direction of the surface of the base material (copper alloy sheet strip) is set in a range of 0.01 to 0.5 mm. Regarding the unevenness average distance Sm, preferably, the lower limit is 0.05 mm and the upper limit is 0.3 mm.

(8) Average Thickness of Co Layer and Fe Layer

Like the Ni layer, the Co layer and the Fe layer are useful to suppress diffusion of base material constituent elements into the material surface to thereby suppress growth of the Cu—Sn alloy layer, leading to prevention of consumption of the Sn layer, suppression of an increase in contact resistance after use at high temperature over a long time, and achievement of satisfactory solder wettability. Therefore, the Co layer or the Fe layer can be used as a ground plating layer in place of the Ni layer. However, when the average thickness of the Co layer or Fe layer is less than 0.1 μm, like the Ni layer, it becomes impossible to sufficiently exert the effect because of increasing of point defects in the Co layer or Fe layer. When the Co layer or Fe layer becomes thick, namely, the average thickness thereof becomes more than 3.0 μm, like the Ni layer, the effect is saturated, formability into a terminal degrades, such as occurrence of cracking during bending, and also productivity and economy degrade. Therefore, when the Co layer or Fe layer is used as a ground layer in place of the Ni layer, the average thickness of the Co layer or Fe layer is set in a range of 0.1 to 3.0 μm. Regarding the average thickness of the Co layer or Fe layer, preferably, the lower limit is 0.2 μm and the upper limit is 2.0 μm.

It is also possible to use, as a ground plating layer, the Co layer and Fe layer together with the Ni layer. In this case, the Co layer or Fe layer is formed between a surface of the base material and the Ni layer, or between the Ni layer and the Cu—Sn alloy layer. The total average thickness of the Ni layer and Co layer, or the Ni layer and Fe layer is set in a range of 0.1 to 3.0 μm for the same reason in the case where the ground plating layer is only the Ni layer, Co layer or Fe layer. Regarding the total average thickness of the Ni layer and the Co layer, or the Ni layer and Fe layer, preferably, the lower limit is 0.2 μm and the upper limit is 2.0 μm.

(9) Thickness of $Cu_2$ O Oxide Film

After heating in atmospheric air at 160° C. for 1,000 hours, a $Cu_2$ O oxide film is formed by diffusion of Cu on the material surface of a surface coating layer. $Cu_2$ O has extremely high electrical resistivity as compared with $SnO_2$ and CuO, and the $Cu_2$ O oxide film formed on the material surface serves as electric resistance. When the $Cu_2$ O oxide film is thin, contact resistance does not excessively increase because of becoming a state where free electrons pass through the $Cu_2$ O oxide film comparatively easily (tunnel effect). When the thickness of the $Cu_2$ O oxide film exceeds 15 nm ($Cu_2$ O exists at a position deeper than 15 nm from the outermost surface of the material), contact resistance increases. As the proportion of the ε phase in the Cu—Sn alloy layer increases, a thicker $Cu_2$ O oxide film is formed ($Cu_2$ O is formed at a deeper position from the outermost surface). To prevent contact resistance from increasing by limiting the thickness of the $Cu_2$ O oxide film to 15 nm or less, there is a need to set a ratio of the average thickness of the ε phase to the average thickness of the Cu—Sn alloy layer at 30% or less.

(III) Method for Producing Copper Alloy Sheet Strip with Surface Coating Layer

The copper alloy sheet strip with a surface coating layer according to the present invention includes a copper alloy sheet strip in which a Cu—Sn alloy layer is not exposed on the outermost surface, and a copper alloy sheet strip in which a Cu—Sn alloy layer is exposed on the outermost surface. Furthermore, the latter includes a copper alloy sheet strip in which a base material (copper alloy sheet strip itself) has large surface roughness (arithmetic average roughness Ra in at least one direction≥0.15 μm) and a copper alloy sheet strip in which a base material has small surface roughness (arithmetic average roughness Ra in all directions<0.15 μm). The method for producing these copper alloy sheet strips with a surface coating layer will be described below.

(1) Copper Alloy Sheet Strip in which Cu—Sn Alloy Layer is not Exposed on Outermost Surface As mentioned in Patent Document 1, this copper alloy sheet strip with a surface coating layer can be produced by forming a Ni plating layer as ground plating on a surface of copper alloy sheet strip, forming a Cu plating layer and a Sn plating layer in this order, performing a reflow treatment, forming a Cu—Sn alloy layer through mutual diffusion of Cu of the Cu plating layer and Sn of the Sn plating layer, allowing the Cu plating layer to disappear, and allowing the molten and solidified Sn plating layer to appropriately remain on the surface layer section.

It is possible to use, as a plating solution, plating solutions mentioned in Patent Document 1 for Ni plating, Cu plating and Sn plating. Plating conditions may be as follows: Ni plating/current density: 3 to 10 A/$dm^2$, bath temperature: 40 to 55° C., Cu plating/current density: 3 to 10 A/$dm^2$, bath temperature: 25 to 40° C., Sn plating/current density: 2 to 8 A/$dm^2$, and bath temperature: 20 to 35° C. The current density is preferably low.

In the present invention, a Ni plating layer, a Cu plating layer and a Sn plating layer each means a surface plating layer before a reflow treatment. A Ni layer, a Cu—Sn alloy layer and a Sn layer each means a plating layer after a reflow treatment, or a compound layer formed by the reflow treatment.

The thickness of the Cu plating layer or the Sn plating layer is set on the assumption that a Cu—Sn alloy layer formed after a reflow treatment becomes a η single phase in an equilibrium state. Depending on the conditions of the reflow treatment, a ε phase remains without reaching an equilibrium state. To decrease the proportion of the ε phase in the Cu—Sn alloy layer, the conditions may be set so as to approach an equilibrium state by adjusting one or both of the heating temperature and heating time. Namely, it is effective to increase the reflow treatment time and/or to raise the reflow treatment temperature. To set a ratio of the average thickness of the ε phase to the average thickness of the Cu—Sn alloy layer at 30% or less, the condition of the reflow treatment is selected in a range of 20 to 40 seconds at an ambient temperature of a melting point of a Sn plating layer or higher and 300° C. or lower, or selected in a range of 10 to 20 seconds at an ambient temperature of higher than 300° C. and 600° C. or lower. A reflow treatment furnace to be used is a reflow treatment furnace having heat capacity that is sufficiently larger than that of plating material to be subjected to a heat treatment. By selecting the conditions of higher temperature over a longer time within the above range, it is possible to set a ratio of the length of the ε phase to the length of the ground layer at 50% or less in a cross-section of the surface coating layer.

As the cooling rate after the reflow treatment increases, the grain size of the Cu—Sn alloy layer decreases. Whereby, hardness of the Cu—Sn alloy layer increases, so that apparent hardness of the Sn layer increases, which is more effective to reduce a friction coefficient when formed into a terminal. Regarding the cooling rate after the reflow treatment, the cooling rate from a melting point (232° C.) of Sn to a water temperature is preferably set at 20° C./second or more, and more preferably 35° C./second or more. Specifically, it is possible to achieve the cooling rate by continuously quenching a Sn plated material while passing in a water tank at a water temperature of 20 to 70° C. immediately after the reflow treatment, or shower cooling with water at 20 to 70° C. after exiting a reflow heating furnace, or a combination of shower and a water tank. After the reflow treatment, it is desirable to perform heating of the reflow treatment in a non-oxidizing atmosphere or a reducing atmosphere so as to make the Sn oxide film on the surface thin.

In the production process mentioned above, a Ni plating layer, a Cu plating layer and a Sn plating layer include, in addition to Ni, Cu and Sn metals, a Ni alloy, a Cu alloy and a Sn alloy, respectively. When the Ni plating layer is made of a Ni alloy and the Sn plating layer is made of a Sn alloy, it is possible to use each alloy described above as for the Ni layer and the Sn layer. When the Cu plating layer is made of a Cu alloy, examples of constituents other than Cu of the Cu alloy include Sn, Zn and the like. The proportion of Sn in the Cu alloy is preferably less than 50% by mass, and the proportion of the other element is preferably less than 5% by mass.

In the production process, a Co plating layer or a Fe plating layer may be formed as a ground plating layer in place of the Ni plating layer. Alternatively, a Co plating layer or a Fe plating layer may be formed, and then the Ni plating layer may formed. Alternatively, the Ni plating layer may formed, and then a Co plating layer or a Fe plating layer may also be formed.

(2) Copper Alloy Sheet Strip in which Cu—Sn Alloy Layer is Exposed on Outermost Surface and Base Material has Large Surface Roughness As mentioned in (II) (6a) and (6b), this copper alloy sheet strip with a surface coating layer can be produced by roughening a surface of a copper alloy sheet strip as a base material, followed by plating under the conditions mentioned in (1) and further a reflow treatment. Surface roughness of the roughened base material is set at 0.15 μm or more or 0.3 μm or more in terms of arithmetic average roughness Ra in at least one direction, and 4.0 μm or less in terms of arithmetic average roughness Ra in all directions. As a result, it is possible to produce a copper alloy sheet strip with a surface coating layer, which includes a surface coating layer including a Sn layer having an average thickness of 0.05 to 5.0 μm on the outermost surface, a Cu—Sn alloy layer being partially exposed on the surface (see (II) (6a) and (6b)). In this case, the lower limit of the average thickness of the Sn layer is preferably 0.2 μm, while the upper limit is preferably 2.0 μm, and more preferably 1.5 μm.

After the reflow treatment, gloss or non-gloss Sn plating may be further performed. In this case, the Cu—Sn alloy layer is not exposed on the outermost surface of the surface coating layer.

For roughening of a surface of the copper alloy sheet strip, for example, the copper alloy sheet strip is rolled using a rolling roll roughened by polishing or shot blasting. When using a roll roughened by shot blasting, the exposure conformation of the Cu—Sn alloy layer exposed on the outermost surface of the surface coating layer becomes a random structure. When using a roll roughened by polishing a rolling roll to form deep polishing marks, and forming random unevenness by shot blasting, the exposure conformation of the Cu—Sn alloy layer exposed on the outermost surface of the surface coating layer becomes a composite conformation composed of a random structure and a linear structure extending in parallel with the rolling direction.

(3) Copper Alloy Sheet Strip in which Cu—Sn Alloy Layer is Exposed on Outermost Surface and Base Material has Small Surface Roughness As mentioned in (II) (6c), even when arithmetic average roughness Ra of the surface of the copper alloy sheet strip as the base material is less than 0.15 μm in all directions, it is possible to produce a copper alloy sheet strip with a surface coating layer in which the Cu—Sn alloy layer is partially exposed on the surface. In this case, polishing marks of buff or roll marks are formed in the rolling parallel direction (direction in parallel with the rolling direction) on the surface of the copper alloy sheet strip as the base material by the method described below, whereby, arithmetic average roughness Ra in the rolling vertical direction where surface roughness becomes largest is adjusted in a range of less than 0.15 μm. The plating method and reflow treatment conditions may be those mentioned in (1). As a result, it is possible to produce a copper alloy sheet strip with a surface coating layer, which includes a surface coating layer including a Sn layer having an average thickness of 0.05 μm or more on the outermost surface, a Cu—Sn alloy layer being partially exposed on the surface (see (II) (6c)).

The copper alloy sheet strip as the base material can be produced by the steps of hot rolling, rough rolling, rolling before finishing, intermediate annealing, polishing, finish rolling, and, if necessary, stress relief annealing and polishing. It is possible to suitably employ, as the method for forming polishing marks or roll marks, either method (a) or (b) mentioned below in the polishing and finish rolling steps.

(a) In the polishing step after intermediate annealing, the surface is polished by pressing a rotating buff against a copper alloy sheet strip (rotation axis of buff is vertical to the rolling direction). The buff to be used for polishing is a buff including abrasive grains that are slightly coarse as compared with conventional finish abrasive grains. After selecting one or more implementation conditions such as higher rotational speed of a buff than usual, higher pressing pressure against a copper alloy sheet strip and higher feed rate of a copper alloy sheet strip, polishing marks that are slightly rough as compared with conventional polishing marks are formed on the surface of the copper alloy sheet strip. After polishing, finish rolling is performed by one pass at a rolling reduction ratio of 10% or less using a conventional finish rolling roll (surface roughness measured in roll axial direction; arithmetic average roughness Ra: about 0.02 to 0.08 μm, maximum height roughness Rz: about 0.2 to 0.9 μm).

(b) The finish rolling step is performed by two-stage rolling of rolling using a roll having a rough surface as compared with a conventional finish rolling roll (surface roughness measured in roll axial direction; arithmetic average roughness Ra: about 0.07 to 0.18 μm, maximum height roughness Rz: about 0.7 to 1.5 μm) and rolling using a conventional finish rolling roll. Rolling using a roll having a rough surface as compared with a conventional finish rolling roll is performed in one or several passes at a total rolling reduction ratio of desirably 10% or more, whereby, roll marks that are slightly rough as compared with a conventional finish rolling roll are formed on the surface of the copper alloy sheet strip. Subsequently, rolling using a conventional finish rolling roll is performed in one pass (final pass) at a rolling reduction ratio of 10% or less.

In both cases of (a) and (b), each thickness of a Ni plating layer, a Cu plating layer and a Sn plating layer is adjusted in the following manner. First, the thickness of the Ni plating layer is set in a range of 0.1 to 1 μm. The upper limit of the Ni plating layer is preferably 0.8 μm. Thereafter, Cu plating and Sn plating are performed. The average thickness of the Sn plating layer is set at the average thickness that is two or more times of the average thickness of the Cu plating layer, and also each average thickness of the Cu plating layer and the Sn plating layer is adjusted so that the Sn layer having an average thickness of 0.05 to 0.7 μm remains after the reflow treatment. The upper limit of the average thickness of the Sn layer is preferably 0.4 μm.

By adjusting the production conditions as mentioned above, it is possible to partially expose the Cu—Sn alloy layer on the outermost surface of the surface coating layer even when using a base material whose arithmetic average roughness Ra in all directions is less than 0.15 μm. In this case, arithmetic average roughness Ra of the surface coating layer is the largest in the rolling vertical direction, and is in a range of about 0.03 μm or more and less than 0.15 μm. The surface exposure conformation of the Cu—Sn alloy layer becomes the conformation in which the Cu—Sn alloy layer is linearly exposed in parallel with the rolling direction, or the conformation in which a spot- or island-shaped (irregular conformation) Cu—Sn alloy layer is exposed around the Cu—Sn alloy layer that is linearly exposed in parallel with the rolling direction. The Cu—Sn alloy layer is exposed on the outermost surface, but is flat while reflecting small surface roughness of the base material (copper alloy sheet strip) and does not protrude from the Sn layer.

After the reflow treatment, gloss or non-gloss Sn plating may be further performed. In this case, the Cu—Sn alloy layer is not exposed on the outermost surface of the surface coating layer.

Even when the base material has small surface roughness and a comparatively thick (0.05 to 0.7 μm) Sn layer is allowed to remain on the surface after the reflow treatment, the Cu—Sn alloy layer is exposed on the surface, but the mechanism of this phenomenon is unclear. However, it is estimated that, in the finish rolling and polishing steps, machining energy accumulated in the region of the surface along roll marks and polishing marks of the base material is large as compared with the case where conventional finish rolling and polishing are performed, whereby, a crystal growth rate of the Cu—Sn alloy increases in the region. To cause this phenomenon, there is a need to keep the average thickness of the Ni plating layer (average thickness of the Ni layer), and the average thickness of the Sn layer after the reflow treatment in the above ranges.

Example 1

A copper alloy was melted in atmospheric air while charcoal coating to produce a 75 mm thick ingot consisting of Ni: 0.83% by mass, Sn: 1.23% by mass, P: 0.074% by mass, Fe: 0.025% by mass, Zn: 0.16% by mass, Mn: 0.01% by mass, with the balance being Cu and inevitable impurities. The contents of oxygen (O) and hydrogen (H) analyzed in the ingot were 12 ppm and 1 ppm, respectively. This ingot was subjected to a homogenization treatment at 950° C. for 2 hours, and hot-rolled to a thickness of 16.5 mm, followed by water quenching from a temperature of 750° C. or higher. Both sides of this hot-rolled material were ground to thereby reduce to a thickness of 14.5 mm, followed by cold rolling to a thickness of 0.7 mm. Subsequently, a heat treatment was performed in a salt bath at 660° C. for a short time of 20 seconds, followed by pickling and polishing, and further cold rolling to a thickness of 0.25 mm. Thereafter, a heat treatment was performed in a niter bath at 400° C. for a short time of 20 seconds to obtain a base material for plating.

As a result of observation of the base material using a transmission electron microscope (TEM), a precipitate having a diameter of more than 60 nm did not exist in the visual field, and the number of precipitates each having a diameter of 5 nm or more and 60 nm or less was 72 in the visual field of 500 nm×500 nm.

Various properties of the base material were measured by the method mentioned in Examples of Patent Document 5. The results are as shown below. Conductivity: 34% IACS. 0.2% Proof stress: 560 MPa (LD), 575 MPa (TD). Elongation: 10% (LD), 9% (TD). W bending (R/t=2): no cracking in LD and TD. Stress relaxation rate: 11% (LD), 14% (TD). LD means longitudinal to rolling direction (rolling direction) and TD means transverse to rolling direction (transverse direction). The above properties are nearly the same as in copper alloy sheets (Nos. 1 to 4) mentioned in Example 5 of Patent Document 5.

The base material was subjected to pickling and degreasing and subjected to ground plating (Ni, Co, Fe), Cu plating and Sn plating in each thickness, followed by a reflow treatment to obtain test materials Nos. 1 to 26 shown in Table 1. In all test materials, a Cu plating layer disappeared. The conditions of the reflow treatment were as follows: at 300° C. for 20 to 30 seconds or 450° C. for 10 to 15 seconds for the test materials Nos. 1 to 21, 23 and 26, and conventional conditions (at 280° C. for 8 seconds) for the test material No. 22. The conditions of the reflow treatment were as follows: at 290° C. for 10 seconds for the test material No. 24, and at 285° C. for 8 seconds for the test material No. 25.

The surface of the base material was not roughened, and surface roughness in the rolling vertical direction was 0.025 μm in terms of arithmetic average roughness Ra, and 0.1 μm in terms of maximum height roughness Rz. Except for the test material No. 21 in which the Sn plating layer disappeared by the reflow treatment, the Cu—Sn alloy layer was not exposed on the outermost surface.

In the test materials Nos. 1 to 26, the measurement was made of each average thickness of a ground layer (Ni layer, Co layer, Fe layer), a Cu—Sn alloy layer and a Sn layer, a ε phase thickness ratio (ratio of the average thickness of the ε phase to the average thickness of the Cu—Sn alloy layer), and a ε phase length ratio (a ratio of the length of the ε phase to the length of the Ni layer) by the following procedure. In the test materials Nos. 1 to 26, a thickness of a $Cu_2$ O oxide film, and contact resistance after heating at high temperature over a long time were measured by the following procedure, and a test of thermal peeling resistance was performed.

(Measurement of Average Thickness of Ni Layer)

Using an X-ray fluorescent analysis thickness meter (manufactured by Seiko Instruments Inc.; SFT3200), an average thickness of a Ni layer of the test material was calculated. Regarding the measurement conditions, a two-layer calibration curve of Sn/Ni/base material was used as a calibration curve, and a collimeter diameter was set at φ0.5 mm.

(Measurement of Average Thickness of Co Layer)

Using an X-ray fluorescent analysis thickness meter (manufactured by Seiko Instruments Inc.; SFT3200), an average thickness of a Co layer of the test material was calculated. Regarding the measurement conditions, a two-layer calibration curve of Sn/Co/base material was used as a calibration curve, and a collimeter diameter was set at φ0.5 mm.

(Measurement of Average Thickness of Fe Layer)

Using an X-ray fluorescent analysis thickness meter (manufactured by Seiko Instruments Inc.; SFT3200), an average thickness of a Fe layer of the test material was calculated. Regarding the measurement conditions, a two-layer calibration curve of Sn/Fe/base material was used as a calibration curve, and a collimeter diameter was set at (φ0.5 mm.

(Measurement of Average Thickness of Cu—Sn Alloy Layer, ε Phase Thickness Ratio, and ε Phase Length Ratio)

A cross-section (cross-section in the rolling vertical direction) of the test material worked by microtome was observed at a magnification of 10,000 times using a scanning electron microscope. An area of a Cu—Sn alloy layer was calculated from the thus obtained cross-sectional composition image by image processing analysis, and a value obtained by dividing by a width of the measured area was regarded as an average thickness. The cross-section of the test material was a cross-section in the rolling vertical direction. In the same composition image, an area of a ε phase was calculated by image analysis and a value obtained by dividing by a width of the measured area was regarded as an average thickness. By dividing the average thickness of the ε phase by the average thickness of the Cu—Sn alloy layer, a ε phase thickness ratio (ratio of the average thickness of the ε phase to the average thickness of the Cu—Sn alloy layer) was calculated. Furthermore, in the same composition image, the length of the ε phase (length along the width direction of the measured area) was measured, and a ε phase length ratio (ratio of the length of the ε phase to the length of the ground layer) was calculated by dividing the length of the ε phase by the length of the ground layer (width of the measured area). Each measurement was carried out in five visual fields and the average thereof was regarded as the measured value.

A cross-sectional composition image (cross-section in the rolling vertical) taken by a scanning electron microscope of the test material No. 1 is shown in FIG. 1. In the same composition image, an outlined line is drawn by tracing the boundary between a Ni layer and a base material, the boundary between a Ni layer and a Cu—Sn alloy layer (η phase and ε phase), and the boundary between a ε phase and a η phase. As shown in FIG. 1, a surface plating layer 2 is formed on a surface of a copper alloy base material 1, and the surface plating layer 2 is composed of a Ni layer 3, a Cu—Sn alloy layer 4 and a Sn layer 5, and the Cu—Sn alloy layer 4 is composed of a ε phase **4*a* and a η phase 4*b*. The ε phase 4*a* is formed between the Ni layer 3 and the η phase 4*b*, and is in contact with the Ni layer. The ε phase 4*a* and the η phase 4*b* of the Cu—Sn alloy layer 4** were confirmed by observation of color tone of a cross-sectional composition image, and quantitative analysis of the Cu content using an energy dispersive X-ray spectrometer (EDX).

(Measurement of Average Thickness of Sn Layer)

First, using an X-ray fluorescent analysis thickness meter (manufactured by Seiko Instruments Inc.; SFT3200), the sum of a film thickness of a Sn layer of a test material and a film thickness of a Sn component contained in a Cu—Sn alloy layer were measured. Thereafter, the Sn layer was removed by immersing in an aqueous solution containing p-nitrophenol and caustic soda as components for 10 minutes. Using an X-ray fluorescent analysis thickness meter, a film thickness of a Sn component contained in a Cu—Sn alloy layer was measured again. Regarding the measurement conditions, a single-layer calibration curve of Sn/base material or a two-layer calibration curve of Sn/Ni/base material was used as a calibration curve, and a collimeter diameter was set at φ0.5 mm. The average thickness of the Sn layer was calculated by subtracting the film thickness of a Sn component contained in a Cu—Sn alloy layer from the thus obtained sum of a film thickness of a Sn layer and a film thickness of a Sn component contained in a Cu—Sn alloy layer.

(Test of Thermal Peeling Resistance after Heating at High Temperature Over Long Time)

Figure 2:
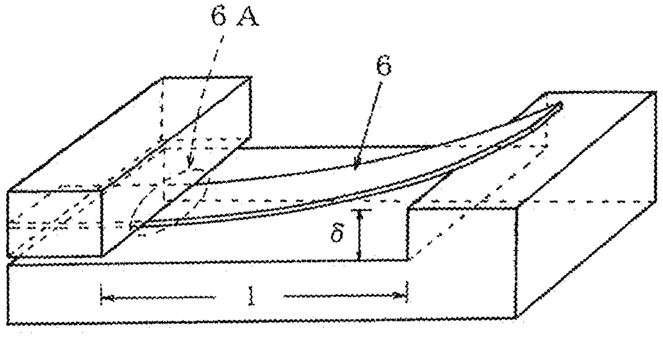
FIG. 2 is a perspective view for explaining a test jig used in a test of thermal peeling resistance, and a test method.

A test specimen having a width of 10 mm and a length of 100 mm (length direction is the rolling parallel direction) was cut out from a test material, and deflection displacement δ was applied to a position of the length l of the test specimen 6 by a cantilever type test jig shown in FIG. 2 and then 80% bending stress of 0.2% proof stress at room temperature was applied to the test specimen 6. In this case, a compressive force is applied to an upper surface of test specimen 6 and a tensile force is applied to a lower surface. In this state, the test specimen 6 was heated in atmospheric air at 160° C. for 1,000 hours followed by removing the stress. This test method is based on Technical Standards of The Japan Copper and Brass Association JCBAT309:2004, "Method for Stress Relaxation Test of Copper and Copper Alloy Thin Sheet Strip due to Bending". In Examples, the deflection displacement δ was set at 10 mm and the span length l was determined by the formula mentioned in the test method.

Figure 3A:
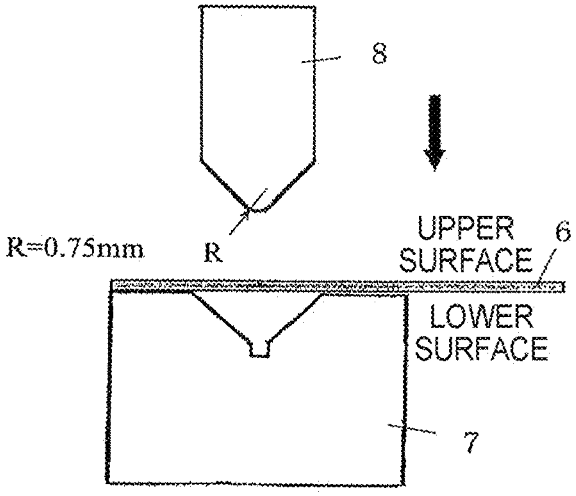
FIG. 3A is a diagram for explaining 90° bending and return bending after heating at high temperature over a long time, which are performed in a test of thermal peeling resistance.
Figure 3B:
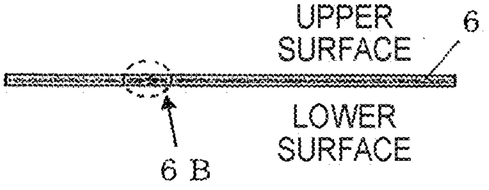
FIG. 3B is a diagram for explaining 90° bending and return bending after heating at high temperature over a long time, which are performed in a test of thermal peeling resistance.

After heating, the test specimen 6 was subjected to 90° bending (FIG. 3A) at a bending radius R=0.75 mm and return bending (FIG. 3B). In FIG. 3A, the reference numeral 7 denotes a V-shaped block and 8 denotes a pressing metal fitting. In the case of 90° bending, a surface, to which a compressive force was applied by a test jig shown in FIG. 2, was directed upward and a portion 6A serving as a fulcrum when stress is applied was allowed to agree with a bend line.

A transparent resin tape was adhered on both sides of a bend section 6B and peeled off, and then it was confirmed whether or not the surface coating layer is adhered to the tape (whether or not peeling occurs). The case where no peeling occurred in three test specimens was rated "Good", whereas, the case where peeling occurred in any one of test specimens was rated "Bad".

The test specimen 6 was cut at a cross-section including the bend section 6B (cross-section vertical to the bend line). After resin embedding and polishing, it was observed whether or not voids and peeling are observed at an interface between a Ni layer and a Cu—Sn alloy layer, using a scanning electron microscope. The case where neither voids nor peeling were (was) observed was rated "Good", whereas, the case where voids or peeling were (was) observed was rated "Bad".

(Measurement of Thickness of $Cu_2$ O Oxide Film)

A test specimen having a width of 10 mm and a length of 100 mm (length direction is the rolling parallel direction) was cut out from a test material, and then 80% bending stress of 0.2% proof stress at room temperature was applied to the test specimen in the same manner as in the test of thermal peeling resistance (see FIG. 2). In this state, the test specimen was heated in atmospheric air at 160° C. for 1,000 hours followed by removing the stress. After the heating, a surface coating layer of the test specimen was etched under the conditions where an etching rate to Sn becomes about 5 nm/min for 3 minutes, and then it was confirmed whether or not $Cu_2$ O exists, using an X-ray photoelectron spectrometer (ESCA-LAB210D, manufactured by VG). The analysis conditions as follows; Alka 300 W (15 kV, 20 mA), and analysis area: 1 mmφ. If $Cu_2$ O was detected, it was judged that $Cu_2$ O exists at a position deeper than 15 nm from the outermost surface (thickness of $Cu_2$ O oxide film exceeds 15 nm ($Cu_2$ O>15 nm)). If $Cu_2$ O was not detected, it was judged that $Cu_2$ O does not exist at a position deeper than 15 nm from the outermost surface (thickness of $Cu_2$ O oxide film is 15 nm or less ($Cu_2$ O≤15 nm)).

(Measurement of Contact Resistance after Heating at High Temperature Over Long Time)

A test specimen having a width of 10 mm and a length of 100 mm (length direction is the rolling parallel direction) was cut out from a test material, and then 80% bending stress of 0.2% proof stress at room temperature was applied to the test specimen in the same manner as in the test of thermal peeling resistance (see FIG. 2). In this state, the test specimen was heated in atmospheric air at 160° C. for 1,000 hours followed by removing the stress. Using the test specimen after heating, contact resistance was measured five times by a four-terminal method under the conditions of an open-circuit voltage of 20 mV, a current of 10 mA, and a load of 3 N with sliding. The average was regarded as contact resistivity.

TABLE 1

| No. | Thickness of surface coating layer (μm) Ground* | Cu—Sn | Sn | Thickness ratio of ε phase (%) | Length ratio of ε phase (%) | Thickness of $Cu_2O$ (nm) | Contact resistance after heating at high temperature (mΩ) | Thermal peeling resistance Peeling of tape | Ground/Cu—Sn interface |
|---|---|---|---|---|---|---|---|---|---|
| 1 | Ni: 0.3 | 0.5 | 0.9 | 2 | 15 | ≤15 | 0.6 | Good | Good |
| 2 | Ni: 0.6 | 0.6 | 0.15 | 0 | 0 | ≤15 | 0.8 | Good | Good |
| 3 | Ni: 0.8 | 0.6 | 0.6 | 5 | 27 | ≤15 | 0.7 | Good | Good |
| 4 | Ni: 0.4 | 0.6 | 2.4 | 13 | 38 | ≤15 | 0.4 | Good | Good |
| 5 | Ni: 0.3 | 1.7 | 0.4 | 17 | 45 | ≤15 | 0.9 | Good | Good |
| 6 | Ni: 1.5 | 0.2 | 0.5 | 25 | 47 | ≤15 | 1.0 | Good | Good |
| 7 | Ni: 2.4 | 0.9 | 0.9 | 13 | 28 | ≤15 | 0.6 | Good | Good |
| 8 | Co: 0.5 | 0.5 | 0.7 | 15 | 39 | ≤15 | 0.9 | Good | Good |

TABLE 1-continued

| No. | Thickness of surface coating layer (μm) Ground* | Cu—Sn | Sn | Thickness ratio of ε phase (%) | Length ratio of ε phase (%) | Thickness of $Cu_2O$ (nm) | Contact resistance after heating at high temperature (mΩ) | Thermal peeling resistance Peeling of tape | Ground/Cu—Sn interface |
|---|---|---|---|---|---|---|---|---|---|
| 9 | Fe: 0.4 | 0.6 | 1.1 | 12 | 27 | ≤15 | 0.9 | Good | Good |
| 10 | Ni: 0.3<br>Co: 0.4 | 0.5 | 0.5 | 8 | 24 | ≤15 | 0.5 | Good | Good |
| 11 | Ni: 0.3<br>Fe: 0.4 | 0.5 | 0.5 | 8 | 28 | ≤15 | 0.4 | Good | Good |
| 12 | Ni: 0.5 | 0.4 | 0.35 | 18 | 38 | ≤15 | 0.7 | Good | Good |
| 13 | Ni: 0.8 | 0.8 | 0.6 | 26 | 43 | ≤15 | 0.9 | Good | Good |
| 14 | Ni: 0.5 | 0.5 | 0.3 | 26 | 52 | ≤15 | 0.9 | Bad | Bad |
| 15 | Ni: 0.8 | 0.7 | 0.4 | 28 | 58 | ≤15 | 0.9 | Bad | Bad |
| 16 | Ni: 0.5 | 0.5 | 0.08 | 0 | 0 | ≤15 | 1.0 | Good | Good |
| 17 | Ni: 0.3 | 0.4 | 0.4 | 0 | 0 | ≤15 | 0.8 | Good | Good |
| 18 | Co: 0.3<br>Ni: 0.3 | 0.6 | 0.5 | 0 | 0 | ≤15 | 0.4 | Good | Good |
| 19 | Ni: 0.05 | 0.5 | 0.4 | 20 | 40 | ≤15 | 5 | Good | Good |
| 20 | Ni: 0.4 | 0.05 | 1.0 | 5 | 15 | >15 | 12 | Good | Good |
| 21 | Ni: 0.5 | 0.5 | 0 | 10 | 30 | >15 | 6 | Good | Good |
| 22 | Ni: 0.5 | 0.4 | 0.2 | 50 | 90 | >15 | 7 | Bad | Bad |
| 23 | — | 0.4 | 0.8 | 10 | 25 | >15 | 10 | Good | — |
| 24 | Ni: 0.8 | 0.8 | 0.5 | 34 | 48 | >15 | 1.3 | Bad | Bad |
| 25 | Ni: 0.8 | 0.9 | 0.5 | 37 | 65 | >15 | 3.8 | Bad | Bad |
| 26 | Ni: 0.4 | 0.4 | 0.03 | 4 | 11 | >15 | 2.5 | Good | Good |

*When a ground layer is composed of two layers, an upper layer is in contact with a Cu—Sn alloy layer and a lower layer is in contact with a base material.

The above results are shown in Table 1.

In the test materials Nos. 1 to 18 in which structure of a surface coating layer and an average thickness of each layer, and a ε phase thickness ratio satisfy the provisions of the present invention, a thickness of a $Cu_2$ O oxide film is 15 nm or less and contact resistance after heating at high temperature over a long time is maintained at a low value of 1.0 mΩ or less. The test materials Nos. 1 to 13, and 16 to 18, in which a ε phase length ratio satisfies the provisions of the present invention, are also excellent in thermal peeling resistance.

In the test material No. 19 in which a Ni layer has a small average thickness, the test material No. 20 in which a Cu—Sn alloy layer has a small average thickness, the test material No. 21 in which a Sn layer disappeared, the test material No. 22 in which a reflow treatment was performed under conventional conditions and a ε phase thickness ratio is high, the test material No. 23 in which a Ni layer does not exist, the test materials Nos. 24 and 25 in which a reflow treatment is performed under the conditions close to conventional conditions and a ε phase thickness ratio is high, and the test material No. 26 in which a Sn layer has a small average thickness, contact resistance increased after heating at high temperature over a long time, respectively. In the test materials Nos. 20 to 26, the thickness of a $Cu_2$ O oxide film exceeds 15 nm. In the test material No. 24 in which a ε phase thickness ratio is high, and the test materials Nos. 22 and 25 in which a ε phase thickness ratio and a ε phase length ratio are high, peeling of a surface coating layer was generated after heating at high temperature over a long time.

In the test materials Nos. 1 to 13, 16 to 21 and 26 in which peeling of a surface coating layer was not generated, voids were not formed at an interface between a Ni layer and a Cu—Sn alloy layer. However, in the test materials Nos. 14, 15, 22, 24 and 25 in which peeling of a surface coating layer was generated, numerous voids were formed at the interface. These results revealed that peeling of a surface coating layer is generated by connection of voids formed at the interface between the Ni layer and the Cu—Sn alloy layer. In the test material No. 23, observation of voids was not performed.

Example 2

The 0.7 mm thick copper alloy sheet produced in Example 1 (subjected to a heat treatment in a salt bath at 660° C. for a short time of 20 seconds, and subjected to pickling and polishing) was used. This copper alloy sheet was cold-rolled to a thickness of 0.25 mm and then roughened by shot blasting, or cold-rolled to a thickness of 0.25 mm by a rolling roll roughened by polishing and shot blasting. Whereby, surface-roughened copper alloy sheets with various surface roughnesses (arithmetic average roughness Ra in the rolling vertical direction where surface roughness becomes largest is 0.15 μm or more) and conformations (Nos. 27 to 43 in Table 2) were obtained. The test material No. 34 was not subjected to a surface roughening treatment. Thereafter, a heat treatment was performed in a niter bath at 400° C. for a short time of 20 seconds to obtain a base material for plating.

A precipitation state of precipitates, conductivity and mechanical properties of this base material were nearly the same as in Example 1.

After pickling and degreasing, this base material was subjected to ground plating (Ni, Co), Cu plating and Sn plating in each thickness, followed by a reflow treatment to obtain the test materials Nos. 27 to 43. The conditions of the reflow treatment are as follows: at 300° C. for 25 to 35 seconds or 450° C. for 10 to 15 seconds for the test materials Nos. 27 to 40 and 43, conventional conditions (at 280° C. for 8 seconds) for the test material No. 41, and at 290° C. for 8 seconds for the test material No. 42.

In the test materials Nos. 27 to 43, the measurement was made of each average thickness of a ground layer (Ni layer, Co layer), a Cu—Sn alloy layer and a Sn layer, a ε phase thickness ratio, a ε phase length ratio, a thickness of a $Cu_2$ O oxide film, contact resistance after heating at high temperature over a long time and a test of thermal peeling resistance, by the same procedure as in Example 1 were performed. Surface roughness of a surface coating layer, a surface exposed area ratio and a friction coefficient of a Cu—Sn alloy layer were measurement by the following procedure.

(Surface Roughness of Surface Coating Layer)

Surface roughness of a surface coating layer (arithmetic average roughness Ra) was measured based on JIS B0601-1994, using a contact type surface roughness meter (TOKYO SEIMITSU CO., LTD; SURFCOM 1400). The surface roughness measurement conditions are as follows; cut-off value: 0.8 mm, reference length: 0.8 mm, evaluation length: 4.0 mm, measurement rate: 0.3 mm/s, and probe tip radius: 5 μmR. The surface roughness measurement direction was the rolling vertical direction where surface roughness becomes largest.

ENGINEERING CO., LTD.; Model-2152), the male test specimen 7 was pulled in the horizontal direction (sliding rate is 80 mm/min) and a maximum frictional force F (unit: N) until reaching a sliding distance of 5 mm was measured. A friction coefficient was determined by the formula (1) mentioned below.

The reference numeral 11 denotes a load cell, arrow denotes a sliding direction, and the sliding direction was the direction vertical to the rolling direction.

$$\text{Friction coefficient} = F/3.0 \quad (1)$$

TABLE 2

| No. | Thickness of surface coating layer (μm): Ground* | Cu—Sn | Sn | Arithmetic average roughness Ra of surface coating layer (μm) | Thickness ratio of ε phase (%) | Length ratio of ε phase (%) | Thickness of $Cu_2O$ (nm) | Exposure conformation of Cu—Sn alloy layer | Exposure ratio of Cu—Sn alloy layer (%) | Contact resistance after heating at high temperature (mΩ) | Thermal peeling resistance: Peeling of tape | Ground/ Cu—Sn interface | Friction coefficient |
|---|---|---|---|---|---|---|---|---|---|---|---|---|---|
| 27 | Ni: 0.2 | 0.45 | 0.25 | 1.13 | 4 | 12 | ≤15 | Linear + Random | 58 | 1.0 | Good | Good | 0.23 |
| 28 | Ni: 0.4 | 0.5 | 0.5 | 0.62 | 13 | 24 | ≤15 | Random | 52 | 0.9 | Good | Good | 0.26 |
| 29 | Ni: 0.4 | 0.6 | 0.3 | 0.98 | 13 | 22 | ≤15 | Linear + Random | 60 | 0.9 | Good | Good | 0.22 |
| 30 | Ni: 0.5 | 0.8 | 1.0 | 0.80 | 0 | 0 | ≤15 | Linear + Random | 34 | 0.7 | Good | Good | 0.42 |
| 31 | Ni: 0.4 | 0.6 | 0.4 | 0.62 | 0 | 0 | ≤15 | Random | 55 | 0.9 | Good | Good | 0.24 |
| 32 | Ni: 0.4 | 0.6 | 0.4 | 0.12 | 0 | 0 | ≤15 | Random | 24 | 0.8 | Good | Good | 0.38 |
| 33 | Ni: 0.4 | 0.3 | 0.6 | 0.40 | 15 | 33 | ≤15 | Random | 2 | 0.8 | Good | Good | 0.52 |
| 34 | Ni: 0.4 | 0.5 | 0.95 | 0.08 | 19 | 37 | ≤15 | — | 0 | 0.7 | Good | Good | 0.56 |
| 35 | Ni: 0.4 | 0.5 | 0.3 | 0.58 | 25 | 52 | ≤15 | Random | 57 | 1.0 | Bad | Bad | 0.25 |
| 36 | Ni: 0.2 | 0.4 | 0.07 | 0.74 | 0 | 0 | ≤15 | Random | 54 | 0.9 | Good | Good | 0.23 |
| 37 | Ni: 0.5 | 0.5 | 0.16 | 0.84 | 5 | 13 | ≤15 | Linear + Random | 49 | 0.8 | Good | Good | 0.19 |
| 38 | Ni: 1.5 | 0.7 | 0.4 | 1.26 | 0 | 0 | ≤15 | Linear + Random | 39 | 0.6 | Good | Good | 0.27 |
| 39 | Co: 0.5 | 0.7 | 0.35 | 1.14 | 0 | 0 | ≤15 | Linear + Random | 50 | 0.6 | Good | Good | 0.25 |
| 40 | Ni: 0.4<br>Co: 0.3 | 0.5 | 0.4 | 0.94 | 5 | 16 | ≤15 | Random | 39 | 0.7 | Good | Good | 0.28 |
| 41 | Ni: 0.4 | 0.6 | 0.3 | 0.88 | 51 | 76 | >15 | Random | 62 | 0.5 | Bad | Bad | 0.24 |
| 42 | Ni: 0.4 | 0.5 | 0.4 | 0.63 | 35 | 48 | >15 | Random | 52 | 1.8 | Bad | Bad | 0.28 |
| 43 | Ni: 0.4 | 0.4 | 0.03 | 0.73 | 0 | 0 | >15 | Random | 58 | 2.8 | Good | Good | 0.30 |

*When a ground layer is composed of two layers, an upper layer is in contact with a Cu—Sn alloy layer and a lower layer is in contact with a base material.

(Measurement of Exposed Surface Area Ratio of Cu—Sn Alloy Layer)

A surface of a test material was observed at a magnification of 200 times, using a scanning electron microscope (SEM) equipped with an energy dispersive X-ray spectrometer (EDX), and then a surface exposed area ratio of a Cu—Sn alloy layer was measured from the contrasting density of the thus obtained composition image (excluding contrast such as stain and flow) by image analysis. At the same time, the exposure conformation of the Cu—Sn alloy layer was observed. The exposure form was composed of a random structure, or a linear structure and a random structure, and the linear structure was entirely formed in the rolling parallel direction.

(Measurement of Friction Coefficient)

Figure 4:
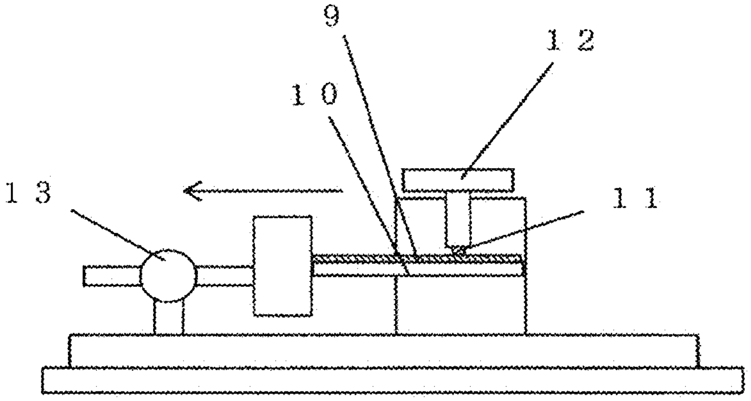
FIG. 4 is a conceptual diagram of a jig for measurement of a friction coefficient.

By simulating the shape of an indent section of an electric contact point in fitting type connection components, measurement was made using a device as shown in FIG. 4. First, a male test specimen 7 of a sheet material cut out from each of the test materials Nos. 27 to 43 was fixed to a horizontal table 8 and a female test specimen 9 cut out from a test material No. 23 (Example 1) of a semispherical machined material (inner diameter is φ1.5 mm) was placed, and then surfaces are brought into contact with each other.

Subsequently, the male test specimen 7 was pressed by applying 3.0 N of a load (weight 10) to the female test specimen 9. Using a horizontal type load cell (AIKOH The above results are shown in Table 2.

In the test materials Nos. 27 to 40 in which structure of a surface coating layer and an average thickness of each layer, and a ε phase thickness ratio satisfy the provisions of the present invention, contact resistance after heating at high temperature over a long time is maintained at a low value of 1.0 mΩ or less. Of these, the test materials Nos. 27 to 34, and 36 to 40, in which a ε phase length ratio satisfies the provisions of the present invention, are also excellent in thermal peeling resistance. In the test materials Nos. 27 to 32 and 35 to 40 in which a surface exposure ratio of a Cu—Sn alloy layer of a surface coating layer satisfies the provisions of the present invention, a friction coefficient is low as compared with the test material No. 33 in which a surface exposure ratio of a Cu—Sn alloy layer is 2%, and the test material No. 34 in which a surface exposure ratio of a Cu—Sn alloy layer is 0%. In the test material No. 32 in which arithmetic average roughness of a surface coating layer Ra is less than 0.15 μm, a friction coefficient is high as compared with the test materials Nos. 27 to 29, 31 and 35 in which each layer of a surface coating layer has nearly the same thickness and a surface coating layer has large arithmetic average roughness Ra.

Meanwhile, in the test materials Nos. 41 and 42 in which a ε phase thickness ratio is large, contact resistance after heating at high temperature over a long time is high and also thermal peeling resistance is inferior. In the test material No.

43 in which a Sn layer has a small average thickness, contact resistance increased after heating at high temperature over a long time. In the test materials Nos. 41 and 42, a Cu—Sn alloy layer exposure ratio satisfies the provisions of the present invention and arithmetic average roughness of a surface coating layer Ra is comparatively large, and a friction coefficient is low.

In the test materials Nos. 27 to 34, 36 to 40 and 43 in which peeling of a surface coating layer did not occur, a void was not formed at an interface between a Ni layer and a Cu—Sn alloy layer. However, in the test materials Nos. 35, 41 and 42 in which peeling of a surface coating layer occurred, numerous voids were formed at the interface.

Example 3

A copper alloy was melted in atmospheric air while charcoal coating to produce a 75 mm thick ingot consisting of Ni: 0.84% by mass, Sn: 1.26% by mass, P: 0.084% by mass, Fe: 0.022% by mass and Zn: 0.15% by mass, with the balance being Cu and inevitable impurities. The contents of oxygen (O) and hydrogen (H) analyzed in the ingot were 10 ppm and 1 ppm, respectively. This ingot was subjected to a homogenization treatment at 950° C. for 2 hours, and hot-rolled to a thickness of 16.5 mm, followed by water quenching from a temperature of 750° C. or higher. Both sides of this hot-rolled material were ground to thereby reduce to a thickness of 14.5 mm, followed by cold rolling to a thickness of 0.7 mm. Subsequently, a heat treatment was performed in a salt bath at 650° C. for a short time of 20 seconds, followed by pickling and polishing, and further cold rolling to a thickness of 0.25 mm. Thereafter, a heat treatment was performed at 350° C. for 2 hours to obtain a base material for plating.

In this production process, by the method mentioned in (III) (3), surface-roughened copper alloy sheets with various surface roughnesses (arithmetic average roughness Ra in the rolling vertical direction where surface roughness becomes largest is less than 0.15 μm) were obtained (Nos. 44 to 52 in Table 3).

As a result of observation of the base material using a transmission electron microscope (TEM), a precipitate having a diameter of more than 60 nm did not exist in the visual field, and the number of precipitates each having a diameter of 5 nm or more and 60 nm or less was 86 in the visual field of 500 nm×500 nm.

Various properties of the base material (No. 44) were measured by the method mentioned in Examples of Patent Document 5. The results are as follows. Conductivity: 39% IACS. 0.2% Proof stress: 560 MPa (LD), 570 MPa (TD). Elongation: 12% (LD), 10% (TD). W bending (R/t=2): no cracking in LD and TD. Stress relaxation rate: 13% (LD), 16% (TD).

The base material was subjected to pickling and degreasing and subjected to Ni plating, Cu plating and Sn plating in each thickness, followed by a reflow treatment to obtain test materials Nos. 44 to 52. The conditions of the reflow treatment are as follows: at 300° C. for 25 to 35 seconds or at 450° C. for 10 to 15 seconds for the test materials Nos. 42 to 50 and 52, and conventional conditions (at 280° C. for 8 seconds) for the test material No. 51.

In the test materials Nos. 44 to 52, the measurement was made of each average thickness of a Ni layer, a Cu—Sn alloy layer and a Sn layer, a ε phase thickness ratio, a ε phase length ratio, a thickness of a $Cu_2$ O oxide film, and contact resistance after heating at high temperature over a long time, and a test of thermal peeling resistance was performed, by the same procedure as in Example 1. Surface roughness of a surface coating layer, and a surface exposed area ratio and a friction coefficient of a Cu—Sn alloy layer (rolling vertical direction: TD, rolling parallel direction: LD) were measurement by the same procedure as in Example 2. The surface exposure conformation of the Cu—Sn alloy layer was entirely a linear structure in the rolling parallel direction.

TABLE 3

| | Thickness of surface coating layer (μm) | | | Arithmetic average roughness Ra of surface coating layer | Thickness ratio of ε phase | Length ratio of ε phase | Thickness of $Cu_2O$ | Exposure conformation of Cu—Sn alloy layer | Exposure ratio of Cu—Sn alloy layer (%) | Contact resistance after heating at high temperature | Thermal peeling resistance | | Friction coefficient | |
|---|---|---|---|---|---|---|---|---|---|---|---|---|---|---|
| No. | Ground | Cu—Sn | Sn | (μm) | (%) | (%) | (nm) | | | (mΩ) | Peeling of tape | Ground/Cu—Sn interface | TD | LD |
| 44 | Ni: 0.4 | 0.5 | 0.25 | 0.04 | 0 | 0 | ≤15 | Linear | 36 | 0.9 | Good | Good | 0.39 | 0.46 |
| 45 | Ni: 0.4 | 0.5 | 0.25 | 0.06 | 8 | 18 | ≤15 | Linear | 38 | 1.0 | Good | Good | 0.36 | 0.45 |
| 46 | Ni: 0.3 | 0.6 | 0.15 | 0.10 | 6 | 14 | ≤15 | Linear | 40 | 1.0 | Good | Good | 0.34 | 0.38 |
| 47 | Ni: 0.5 | 0.5 | 0.4 | 0.04 | 12 | 46 | ≤15 | Linear | 26 | 0.7 | Good | Good | 0.41 | 0.46 |
| 48 | Ni: 0.4 | 0.5 | 0.25 | 0.07 | 25 | 46 | ≤15 | Linear | 44 | 1.0 | Good | Good | 0.36 | 0.40 |
| 49 | Ni: 0.4 | 0.4 | 0.25 | 0.09 | 23 | 53 | ≤15 | Linear | 30 | 0.9 | Bad | Bad | 0.38 | 0.44 |
| 50 | Ni: 0.5 | 0.45 | 0.08 | 0.13 | 4 | 14 | ≤15 | Linear | 43 | 1.0 | Good | Good | 0.27 | 0.31 |
| 51 | Ni: 0.4 | 0.5 | 0.20 | 0.12 | 36 | 59 | >15 | Linear | 40 | 4.9 | Bad | Bad | 0.36 | 0.43 |
| 52 | Ni: 0.3 | 0.5 | 0.02 | 0.09 | 4 | 14 | >15 | Linear | 48 | 2.1 | Good | Good | 0.48 | 0.55 |

The above results are shown in Table 3.

In all of the test materials Nos. 44 to 52, arithmetic average roughness Ra of a surface of the base material was less than 0.15 μm, and a Cu—Sn alloy layer was linearly exposed on a surface of a surface coating layer.

In the test materials Nos. 44 to 50 in which structure of a surface coating layer and an average thickness of each layer, and a thickness ratio of a ε phase satisfy the provisions of the present invention, contact resistance after heating at high temperature over a long time is maintained at a low value of 1.0 mΩ or less. In the test materials Nos. 44 to 50, a surface exposure ratio of a Cu—Sn alloy layer satisfies the provisions of the present invention, and a friction coefficient is small as compared with the test material No. 34 (Table 2) in which a surface exposure ratio of a Cu—Sn alloy layer is 0, and a friction coefficient in the rolling vertical direction particularly decreases. Of these, the test materials Nos. 44 to 48 and 50, in which a ε phase length ratio satisfies the provisions of the present invention, are also excellent in thermal peeling resistance.

Meanwhile, in the test material No. 51 in which a thickness ratio and a length ratio of a ε phase do not satisfy the provisions of the present invention, contact resistance after heating at high temperature over a long time is high, and also thermal peeling resistance is inferior. In the test material No. 52 in which a Sn layer has a small average thickness, contact resistance after heating at high temperature over a long time increased.

In the test materials Nos. 43 to 48, 50 and 52 in which peeling of a surface coating layer did not occur, voids were not formed at an interface between a Ni layer and a Cu—Sn alloy layer. However, in the test materials Nos. 49 and 51 in which peeling of a surface coating layer occurred, numerous voids were formed at the interface.

Example 4

A copper alloy was melted in atmospheric air while charcoal coating to produce a 75 mm thick ingot with the composition shown in Table 4. The content of oxygen (O) analyzed in the ingot was in a range of 7 to 20 ppm, and the content of hydrogen (H) was 1 ppm. This ingot was subjected to a homogenization treatment at 850 to 950° C. for 2 hours, and hot-rolled to a thickness of 16.5 mm, followed by water quenching from a temperature of 700° C. or higher. Both sides of this hot-rolled material were ground to thereby reduce to a thickness of 14.5 mm, followed by cold rolling to a thickness of 0.7 mm. Subsequently, a heat treatment was performed in a salt bath at 660 to 680° C. for a short time of 20 seconds, followed by cold rolling to a thickness of 0.25 mm and further cold rolling to a thickness of 0.25 mm, using a rolling roll roughened by shot blasting, or roughened by polishing or shot blasting. Whereby, surface-roughened copper alloy sheets with various surface roughnesses (arithmetic average roughness Ra in the rolling vertical direction where surface roughness becomes largest is 0.15 μm or more) and conformations were obtained (Nos. 53 to 58 in Table 4). Thereafter, a heat treatment was performed in a niter bath at 400° C. for a short time of 20 seconds or at 350 to 400° C. for 2 hours to obtain a base material for plating.

Using the thus obtained base materials (Nos. 53 to 58), the presence or absence of a particle having a diameter of more than 60 nm, and the number of precipitates having a diameter of 5 nm or more and 60 nm or less existing in the visual field of 500 nm×500 nm were observed by a transmission electron microscope (TEM). Various properties of the base material were measured by the method mentioned in Examples of Patent Document 5. The results are collectively shown in Table 4.

As shown in Table 4, in the base materials Nos. 53 to 58, a precipitate having a diameter of more than 60 nm does not exist, and the number of precipitates having a diameter of 5 nm or more and 60 nm or less existing in the visual field of 500 nm×500 nm satisfies the provisions of Patent Document 5. In the base materials Nos. 53 to 56, properties, that are nearly the same as in Examples of Patent Document 5, are obtained. In the copper alloy sheets Nos. 57 and 58 including comparatively high Ni and high Sn, conductivity is less than 30% IACS, but high strength is obtained.

This base material was subjected to pickling and degreasing, and then subjected to ground plating (Ni, Co), Cu plating and Sn plating in each thickness, followed by a reflow treatment to obtain the test materials Nos. 53 to 58. The conditions of the reflow treatment are as follows: at 325° C. for 25 to 35 seconds.

In the test materials Nos. 53 to 58, the measurements were made of each average thickness of ground layer (Ni layer, Co layer), a Cu—Sn alloy layer and a Sn layer, a ε phase thickness ratio, a ε phase length ratio, a thickness of a $Cu_2O$ oxide film, and contact resistance after heating at high temperature over a long time by the same procedure, and a test of thermal peeling resistance was performed, as in Example 1. Surface roughness of a surface coating layer, a surface exposed area ratio and a friction coefficient of a Cu—Sn alloy layer (in rolling vertical direction) were measured by the same procedure as in Example 2.

TABLE 4

| | Alloy composition (% by mass) | | | | | | | Conductivity | 0.2% Proof stress MPa | | W bending workability* | | Stress relaxation ratio % | | Number of precipitates having a diameter of more than 60 nm | Number of precipitates having a diameter of 5 to 60 nm |
|---|---|---|---|---|---|---|---|---|---|---|---|---|---|---|---|---|
| No. | Ni | Sn | P | Fe | Zn, Mn, Si, Mg | Others | Cu | % IACS | LD | TD | LD | TD | LD | TD | | |
| 53 | 0.45 | 0.56 | 0.045 | 0.02 | — | Cr: 0.04<br>Zr: 0.02 | Balance | 45.7 | 491 | 474 | Good | Good | 12.5 | 14.6 | 0 | 48 |
| 54 | 0.64 | 0.75 | 0.065 | 0.008 | Zn: 0.04 | — | Balance | 42.5 | 525 | 512 | Good | Good | 10.6 | 13.4 | 0 | 61 |
| 55 | 1.06 | 0.92 | 0.055 | — | — | — | Balance | 40.3 | 556 | 541 | Good | Good | 11.4 | 14.3 | 0 | 78 |
| 56 | 1.55 | 1.26 | 0.110 | 0.06 | Zn: 0.25 | Co: 0.02<br>Al: 0.02 | Balance | 32.2 | 556 | 547 | Good | Good | 12.3 | 14.7 | 0 | 84 |
| 57 | 1.95 | 1.56 | 0.088 | — | Zn: 0.2<br>Mn: 0.02<br>Mg: 0.04 | Ti: 0.007<br>B: 0.008 | Balance | 28.9 | 589 | 543 | Good | Good | 10.6 | 12.4 | 0 | 91 |
| 58 | 2.37 | 2.26 | 0.135 | 0.04 | Zn: 0.2<br>Mn: 0.02 | — | Balance | 25.7 | 645 | 627 | Good | Good | 13.6 | 14.5 | 0 | 98 |

*"Good" indicates no cracking.

TABLE 5

| No. | Thickness of surface coating layer (μm): Ground* | Cu—Sn | Sn | Arithmetic average roughness Ra of surface coating layer (μm) | Thickness ratio of ε phase (%) | Length ratio of ε phase (%) | Thickness of $Cu_2O$ (nm) | Exposure conformation of Cu—Sn alloy layer | Exposure ratio of Cu—Sn alloy layer (%) | Contact resistance after heating at high temperature (mΩ) | Thermal peeling resistance: Peeling of tape | Ground/ Cu—Sn interface | Friction coefficient |
|---|---|---|---|---|---|---|---|---|---|---|---|---|---|
| 53 | Ni: 0.2 | 0.4 | 0.2 | 0.59 | 0 | 0 | ≤15 | Linear + Random | 42 | 1.0 | Good | Good | 0.23 |
| 54 | Ni: 0.4 | 0.6 | 0.4 | 0.67 | 4 | 11 | ≤15 | Linear + Random | 56 | 0.8 | Good | Good | 0.29 |
| 55 | Ni: 0.4 | 0.55 | 0.25 | 0.78 | 10 | 18 | ≤15 | Linear + Random | 62 | 0.9 | Good | Good | 0.23 |
| 56 | Co: 0.5 | 0.8 | 0.8 | 0.45 | 0 | 0 | ≤15 | Random | 30 | 0.7 | Good | Good | 0.40 |
| 57 | Ni: 0.5 | 1.0 | 0.35 | 0.88 | 0 | 0 | ≤15 | Linear + Random | 51 | 0.9 | Good | Good | 0.26 |
| 58 | Ni: 0.9 | 0.6 | 0.3 | 0.34 | 0 | 0 | ≤15 | Random | 27 | 0.9 | Good | Good | 0.34 |

The above results are shown in Table 5.

In all of the test materials Nos. 53 to 58, structure of a surface coating layer and an average thickness of each layer, a thickness ratio of a ε phase, the length of ε phase ratio, and arithmetic average roughness of a surface coating layer, and a surface exposure ratio of a Cu—Sn alloy layer satisfy the provisions of the present invention. Therefore, in all of the test materials Nos. 53 to 58, contact resistance after heating at high temperature over a long time is maintained at a low value of 1.0 mΩ or less, and thermal peeling resistance after heating at high temperature over a long time is excellent and a friction coefficient is low.

The present invention includes the following aspects.

Aspect 1:

A copper alloy sheet strip with a surface coating layer excellent in heat resistance, including a copper alloy sheet strip, as a base material, consisting of Ni: 0.4 to 2.5% by mass, Sn: 0.4 to 2.5% by mass, and P: 0.027 to 0.15% by mass, a mass ratio Ni/P of the Ni content to the P content being less than 25, with the balance being Cu and inevitable impurities; and the surface coating layer composed of a Ni layer as a ground layer, a Cu—Sn alloy layer, and a Sn layer formed on a surface of the copper alloy sheet strip in this order; wherein the Ni layer has an average thickness of 0.1 to 3.0 μm, the Cu—Sn alloy layer has an average thickness of 0.1 to 3.0 μm, and the Sn layer has an average thickness of 0.05 to 5.0 μm, and also the Cu—Sn alloy layer is composed of a η phase.

Aspect 2:

The copper alloy sheet strip with a surface coating layer excellent in heat resistance according to the aspect 1, wherein the copper alloy sheet strip as a base material has a structure in which precipitates are dispersed in a copper alloy matrix, each precipitate having a diameter of 60 nm or less, and 20 or more precipitates each having a diameter of 5 nm or more and 60 nm or less being observed in the visual field of 500 nm×500 nm.

Aspect 3:

A copper alloy sheet strip with a surface coating layer excellent in heat resistance, including a copper alloy sheet strip, as a base material, consisting of Ni: 0.4 to 2.5% by mass, Sn: 0.4 to 2.5% by mass, P: 0.027 to 0.15% by mass, a mass ratio Ni/P of the Ni content to the P content being less than 25, with the balance being substantially Cu and inevitable impurities; and the surface coating layer composed of a Ni layer, a Cu—Sn alloy layer, and a Sn layer formed on a surface of the copper alloy sheet strip in this order; wherein the Ni layer has an average thickness of 0.1 to 3.0 μm, the Cu—Sn alloy layer has an average thickness of 0.1 to 3.0 μm, and the Sn layer has an average thickness of 0.05 to 5.0 μm; wherein the Cu—Sn alloy layer is composed of a ε phase and a η phase, the ε phase existing between the Ni layer and the η phase, and a ratio of the average thickness of the ε phase to the average thickness of the Cu—Sn alloy layer being 30% or less.

Aspect 4:

The copper alloy sheet strip with a surface coating layer excellent in heat resistance according to the aspect 3, wherein the copper alloy sheet strip as a base material has a structure in which precipitates are dispersed in a copper alloy matrix, each precipitate having a diameter of 60 nm or less, and 20 or more precipitates each having a diameter of 5 nm or more and 60 nm or less being observed in the visual field of 500 nm×500 nm.

Aspect 5:

The copper alloy sheet strip with a surface coating layer excellent in heat resistance according to the aspect 3 or 4, wherein, in a cross-section of the surface coating layer, a ratio of the length of the ε phase to the length of the ground layer being 50% or less.

Aspect 6:

The copper alloy sheet strip with a surface coating layer excellent in heat resistance according to any one of the aspects 1 to 5, wherein the copper alloy sheet strip as a base material further includes Fe: 0.0005 to 0.15% by mass.

Aspect 7:

The copper alloy sheet strip with a surface coating layer excellent in heat resistance according to any one of the aspects 1 to 6, wherein the copper alloy sheet strip as a base material further includes one or more of Zn: 1% by mass or less, Mn: 0.1% by mass or less, Si: 0.1% by mass or less and Mg: 0.3% by mass or less.

Aspect 8:

The copper alloy sheet strip with a surface coating layer excellent in heat resistance according to any one of the aspects 1 to 7, wherein the copper alloy sheet strip as a base material further includes one or more of Cr, Co, Ag, In, Be, Al, Ti, V, Zr, Mo, Hf, Ta and B in the total amount of 0.1% by mass or less.

Aspect 9:

The copper alloy sheet strip with a surface coating layer excellent in heat resistance according to any one of the aspects 1 to 8, wherein the Cu—Sn alloy layer is partially exposed on the outermost surface of the surface coating layer and a surface exposed area ratio thereof is in a range of 3 to 75%.

Aspect 10:

The copper alloy sheet strip with a surface coating layer excellent in heat resistance according to the aspect 9, wherein surface roughness of the surface coating layer is 0.15 μm or more in terms of arithmetic average roughness Ra in at least one direction, and 3.0 μm or less in terms of arithmetic average roughness Ra in all directions.

Aspect 11:

The copper alloy sheet strip with a surface coating layer excellent in heat resistance according to the aspect 9, wherein surface roughness of the surface coating layer is less than 0.15 μm in terms of arithmetic average roughness in all directions.

Aspect 12:

The copper alloy sheet strip with a surface coating layer excellent in heat resistance according to any one of the aspects 1 to 8, wherein the Sn layer is composed of a reflow Sn plating layer and a gloss or non-gloss Sn plating layer formed thereon.

Aspect 13:

The copper alloy sheet strip with a surface coating layer excellent in heat resistance according to any one of the aspects 1 to 12, wherein a Co layer or a Fe layer is formed as a ground layer in place of the Ni layer, and the Co layer or the Fe layer has an average thickness of 0.1 to 3.0 μm.

Aspect 14:

The copper alloy sheet strip with a surface coating layer excellent in heat resistance according to any one of the aspects 1 to 12, wherein a Co layer or a Fe layer is formed as a ground layer between a surface of the base material and the Ni layer, or between the Ni layer and the Cu—Sn alloy layer, and the total average thickness of the Ni layer and the Co layer or the Ni layer and the Fe layer is in a range of 0.1 to 3.0 μm.

Aspect 15:

The copper alloy sheet strip with a surface coating layer excellent in heat resistance according to any one of the aspects 1 to 14, wherein, on the material surface after heating in atmospheric air at 160° C. for 1,000 hours, $Cu_2$ O does not exist at a position deeper than 15 nm from the outermost surface.

This application claims priority based on Japanese Patent Application No. 2014-025495 filed on Feb. 13, 2014, the disclosure of which is incorporated by reference herein.

DESCRIPTION OF REFERENCE NUMERALS

1 Copper alloy base material
2 Surface plating layer
3 Ni layer
4 Cu—Sn alloy layer
**4*a*** ε Phase
**4*b*** η Phase
5 Sn layer

The invention claimed is:

1. A copper alloy sheet strip with a surface coating layer, comprising:

a copper alloy sheet strip, as a base material, comprising, relative to a total mass of the copper alloy sheet strip, Ni: 0.4 to 2.5% by mass, Sn: 0.4 to 2.5% by mass, and P: 0.027 to 0.15% by mass, a mass ratio Ni/P between the Ni content to the P content being less than 25, as well as one or more of Fe: 0.0005 to 0.15% by mass, Zn: 1% by mass or less, Mn: 0.1% by mass or less, Si: 0.1% by mass or less and Mg: 0.3% by mass or less, as well as Cu and inevitable impurities, and having a structure in which precipitates are dispersed in a copper alloy matrix, each precipitate having a diameter of 60 nm or less, 20 or more precipitates each having a diameter of 5 nm or more and 60 nm or less being observed in the visual field of 500 nm×500 nm; and the surface coating layer comprising a Ni layer, a Cu—Sn alloy layer and a Sn layer formed on a surface of the copper alloy sheet strip in this order, wherein:

the Ni layer has an average thickness of 0.1 to 3.0 μm, the Cu—Sn alloy layer has an average thickness of 0.1 to 3.0 μm, and the Sn layer has an average thickness of 0.05 to 5.0 μm;

the Cu—Sn alloy layer is partially exposed on the outermost surface of the surface coating layer and a surface exposed area ratio thereof is in a range of 3 to 75%;

the Cu—Sn alloy layer comprises a ε phase and a η phase, the ε phase existing between the Ni layer and the η phase, a ratio of the average thickness of the ε phase to the average thickness of the Cu—Sn alloy layer being 30% or less, and a ratio of the length of the ε phase to the length of the Ni layer being 50% or less; and the precipitates comprise a Ni—P intermetallic compound.

2. The copper alloy sheet strip with the surface coating layer according to claim 1, wherein the copper alloy sheet strip as the base material further includes one or more of Cr, Co, Ag, In, Be, Al, Ti, V, Zr, Mo, Hf, Ta and B in the total amount of 0.1% by mass or less, relative to the total mass of the copper alloy sheet strip.

3. The copper alloy sheet strip with the surface coating layer according to claim 2, wherein a surface roughness of the surface coating layer is 0.15 μm or more in terms of arithmetic average roughness Ra in at least one direction, and 3.0 μm or less in terms of arithmetic average roughness Ra in all directions.

4. The copper alloy sheet strip with the surface coating layer according to claim 2, wherein a surface roughness of the surface coating layer is less than 0.15 μm in terms of arithmetic average roughness in all directions.

5. The copper alloy sheet strip with the surface coating layer according to claim 1, wherein a surface roughness of the surface coating layer is 0.15 μm or more in terms of arithmetic average roughness Ra in at least one direction, and 3.0 μm or less in terms of arithmetic average roughness Ra in all directions.

6. The copper alloy sheet strip with the surface coating layer according to claim 5, wherein a Co layer or a Fe layer is formed between a surface of the base material and the Ni layer, or between the Ni layer and the Cu—Sn alloy layer, and the total average thickness of the Ni layer and the Co layer or the Ni layer and the Fe layer is in a range of 0.1 to 3.0 μm.

7. The copper alloy sheet strip with the surface coating layer according to claim 6, wherein, on a material surface after heating in atmospheric air at 160° C. for 1,000 hours, $Cu_2O$ does not exist at a position deeper than 15 run from the outermost surface.

8. The copper alloy sheet strip with the surface coating layer according to claim 5, wherein, on a material surface after heating in atmospheric air at 160° C. for 1,000 hours, $Cu_2O$ does not exist at a position deeper than 15 nm from the outermost surface.

9. The copper alloy sheet strip with the surface coating layer according to claim 5, wherein the Sn layer is composed of a reflow Sn plating layer and a gloss or non-gloss Sn plating layer formed thereon.

10. The copper alloy sheet strip with the surface coating layer according to claim 1, wherein a surface roughness of the surface coating layer is less than 0.15 μm in terms of arithmetic average roughness in all directions.

11. The copper alloy sheet strip with the surface coating layer according to claim 10, wherein a Co layer or a Fe layer is formed between a surface of the base material and the Ni layer, or between the Ni layer and the Cu—Sn alloy layer, and the total average thickness of the Ni layer and the Co layer or the Ni layer and the Fe layer is in a range of 0.1 to 3.0 μm.

12. The copper alloy sheet strip with the surface coating layer according to claim 11, wherein, on a material surface after heating in atmospheric air at 160° C. for 1,000 hours, $Cu_2O$ does not exist at a position deeper than 15 nm from the outermost surface.

13. The copper alloy sheet strip with the surface coating layer according to claim 10, wherein, on a material surface after heating in atmospheric air at 160° C. for 1,000 hours, $Cu_2O$ does not exist at a position deeper than 15 nm from the outermost surface.

14. The copper alloy sheet strip with the surface coating layer according to claim 10, wherein the Sn layer is composed of a reflow Sn plating layer and a gloss or non-gloss Sn plating layer formed thereon.

* * * * *